United States Patent

Reed et al.

[11] Patent Number: 5,396,587
[45] Date of Patent: Mar. 7, 1995

[54] ASYNCHRONOUS, MINIMAL UPDATE DISPLAY SYSTEM

[75] Inventors: David Reed, Wellesley; Carolyn J. Boettner, Cambridge, both of Mass.

[73] Assignee: 501 Lotus Development Corp., Cambridge, Mass.

[21] Appl. No.: 508,242

[22] Filed: Apr. 11, 1990

[51] Int. Cl.⁶ .............................................. G06F 15/00
[52] U.S. Cl. ................................................... 395/145
[58] Field of Search ............... 364/518, 521, 522; 340/747, 750; 395/145, 146, 148, 155, 161; 345/115, 116

[56] References Cited

U.S. PATENT DOCUMENTS

| | | | |
|---|---|---|---|
| 4,674,042 | 6/1987 | Hernandez et al. | 364/401 |
| 4,803,646 | 2/1989 | Burke et al. | 364/561 |
| 4,827,447 | 5/1989 | Croes et al. | 364/900 |
| 4,866,634 | 9/1989 | Reboh et al. | 364/513 |
| 4,870,415 | 9/1989 | Van Maren et al. | 341/94 |
| 4,901,223 | 2/1990 | Rhyne | 364/200 |
| 4,935,728 | 6/1990 | Kley | 340/709 |
| 4,943,866 | 7/1990 | Barker et al. | 358/335 |
| 4,951,039 | 8/1990 | Schwendeman et al. | 340/725 |

*Primary Examiner*—Phu K. Nguyen
*Attorney, Agent, or Firm*—Fish & Richardson

[57] ABSTRACT

A display management system for use with a computer that includes a display system, the display management system including means for generating a representation of a desired screen image; means for periodically updating the display system to display the desired screen image that corresponds to the state of the representation existing at the time of the update; and means for changing the representation so as to record the cumulative effect of a plurality of successive changes that are made to the desired screen image since the last update of the display system.

33 Claims, 16 Drawing Sheets

A:D9: (,0) +D6-D7                                                    READY

| C | A | B | C | D | E | F |
|---|---|---|---|---|---|---|
| 4 | 1987 | January | February | March | | |
| 5 | | | | | | |
| 6 | Income | $11,200 | $11,800 | $13,400 | | |
| 7 | Expenses | 32,600 | 33,000 | 34,500 | | |
| 8 | | | | | | |
| 9 | Profit | (21,400) | (21,200) | (21,100) | | |

| B | A | B | C | D | E | F |
|---|---|---|---|---|---|---|
| 4 | 1987 | January | February | March | | |
| 5 | | | | | | |
| 6 | Income | $28,700 | $29,600 | $31,500 | | |
| 7 | Expenses | 36,300 | 36,900 | 37,100 | | |
| 8 | | | | | | |
| 9 | Profit | (7,600) | (7,300) | (5,600) | | |

| A | A | B | C | D | E | F |
|---|---|---|---|---|---|---|
| 4 | 1987 | January | February | March | | |
| 5 | | | | | | |
| 6 | Income | $45,000 | $53,000 | $23,400 | | |
| 7 | Expenses | 39,500 | 42,500 | 38,800 | | |
| 8 | | | | | | |
| 9 | Profit | (5,500) | (10,500) | (15,400) | | |

Q1_SUM.WK3

FIG. 3

ASYNCHRONOUS, MINIMAL UPDATE DISPLAY SYSTEM

BACKGROUND OF THE INVENTION

The invention relates to the control of the display function in an information management system that organizes information by using, for example, an electronic spreadsheet.

Commonly available spreadsheet programs, such as 1-2-3 by Lotus Development Corporation, provide users with an electronic worksheet for organizing and manipulating data. Such a worksheet can, for example, be configured so that when displayed on a computer screen it looks and functions like a financial spreadsheet. Usually, each worksheet is associated with its own file, and only one file, and thus, only one worksheet can be present in the workspace at any one time.

The worksheet typically consists of a rectangular grid of cells that provides a structure for entering and calculating data and for organizing and storing information. Each cell can store three types of data, namely, labels, values and formulas. Labels are text, such as "Sales" or "Inventory", which can be used to identify and visually organize the values that are entered in a worksheet. Values are numbers. Formulas are expressions that combine labels, values and cell references to yield a label or value as a result.

In some previously available programs, formulas could include any combination of mathematical operations from simple arithmetic, such as addition, subtraction, multiplication, division and exponentiation, etc., to advanced financial and statistical analysis. In such programs, when the user enters a formula into a cell, the program typically calculates the formulas result and displays that result for the cell. In addition, a formula can refer to a range of cells that contains data that the formula will process. For example, in 1-2-3 one such function is referred to as the "at sum" function and has the following form: @SUM(<<range>>), where <<range>> specifies a range of cells. The @SUM function sums the values of the cells in the specified range to produce a result.

Many other functions, similar to the @SUM function, exist in previously available spreadsheet programs for processing data within a range of cells to produce a result. Such functions may be used in financial worksheets, for example, to compute such frequently needed financial statistics as net income, total operating expenses, average costs, to name a few.

One approach to manipulating the worksheet and entering data into the worksheet is by entering each command and each piece of data individually through a keyboard. Another commonly used approach is by using a macro which is a programmed series of keystrokes and special commands. A macro is a user generated program which may be invoked by a short sequence of keystrokes and which automatically implements a much longer commonly used sequence of keystrokes. Thus, instead of having to conduct the sometimes involved and often time consuming process of entering a commonly used sequence of keystrokes through the keyboard, a much shorter sequence of keystrokes is used to invoke the macro that enters that long sequence automatically. Thus, the long sequence of keystrokes is reduced to the short sequence of keystrokes that calls the macro.

Whether the user enters commands individually through the keyboard or automatically through a macro, in previously available systems each command communicated directly with the display. This meant that the display was completely updated after each command so that it displayed the worksheet as revised by that command. Thus, in those earlier systems, using a macro to automatically enter a long keystroke sequence often resulted in many revisions to the displayed image occurring over a very short period of time.

SUMMARY OF THE INVENTION

In general, in one aspect, the invention features a display management system for use with a computer that includes a display system. The display management system includes means for generating a representation of a desired screen image; means for periodically updating the display system to display the desired screen image that corresponds to the state of the representation existing at the time of the update; and means for changing the representation so as to record the cumulative effect of a plurality of successive changes that are made to the desired screen image since the last update of the display system.

Preferred embodiments include the following features. The computer is programmed to provide data storage and management services (e.g., spreadsheet services which organize user supplied information into at least one worksheet including an array of cells) and the desired screen image is a visual presentation of a selected region of stored data, the selected region being a corresponding selected region of a worksheet. The display management system also includes means for generating a map of the cells within the selected region of the worksheet and for using the map to identify those cells within the region whose contents have changed since the last update of the display screen. The updating means updates the display system also based upon the information stored in the map. Also, the representation includes a first data structure that represents the image displayed during the last update of the display screen and a second data structure the represents the desired screen image and the updating means compares the first data structure to the second data structure to determine whether the desired screen image has changed since the last update of the display screen and updates the display screen based upon that comparison.

Also, in preferred embodiments, the representation includes a row array having a plurality of entries each of which corresponds to a different one of the rows of the selected region of the worksheet. The changing means uses the row array to keep track of the location of the rows when the desired screen image is scrolled in a vertical direction. More specifically, the changing means uses the row array to identify which of the rows of the desired screen image were displayed during the last display cycle, to identify which of the rows of the desired screen image were not present during the last display cycle and to determine the screen locations of the identified rows. The updating means redisplays the identified new rows during the next redisplay cycle and instructs the display system to continue displaying the identified previously displayed rows at the corresponding screen locations indicated by the row array.

Further, in preferred embodiments, the representation includes a column array having a plurality of entries each of which corresponds to a different one of the columns of the selected region of the worksheet.

The changing means uses the column array to keep track of the location of the columns when the desired screen image is scrolled in a horizontal direction. More specifically, the changing means uses the column array to identify which of the columns of the desired screen image were displayed during the last display cycle, to identify which of the columns of the desired screen image were not present during the last display cycle and to determine the screen locations of the identified columns. The updating means redisplays the identified new columns during the next redisplay cycle and instructs the display system to continue displaying the identified previously displayed columns at the corresponding screen locations indicated by the column array.

In addition, the display management system includes means for indicating whether the plurality of successive changes that are made to the desired screen image since the last update of the display system have resulted in a complete change of the cell region of the worksheet present in the desired image.

One advantage of the invention is that is provides a more responsive user interface. In particular, the display is not command driven but rather is updated on a periodic basis during a redisplay cycle to reflect the cumulative impact of however many commands have been executed since the last update. If a large number of commands are executed in close succession, by, for example, a macro, the display does not fall behind in its display task by having to display the results of each of the commands in the sequence. Thus, the display does not exhibit a disconcerting lag in its response but rather it tends to remain current with the sequence of command inputs.

In addition, the invention offers the advantage of minimal display update during the redisplay cycle. That is, only those portions of the display that were changed since the last redisplay cycle are redisplayed.

Other advantages and features will become apparent from the following description of the preferred embodiment and from the claims.

DESCRIPTION OF THE PREFERRED EMBODIMENT

FIG. 3 illustrates perspective mode;

STRUCTURE

The following description relates to an applications program that provides spreadsheet capabilities to users. Since the description assumes a familiarity with certain terms and with the organization of the visual display presented to the user, it will begin with a quick review of those terms and the visual display. For the following description, it is assumed that the spreadsheet program is being run on an IBM PC that uses a 80386 microprocessor.

Figure 1:
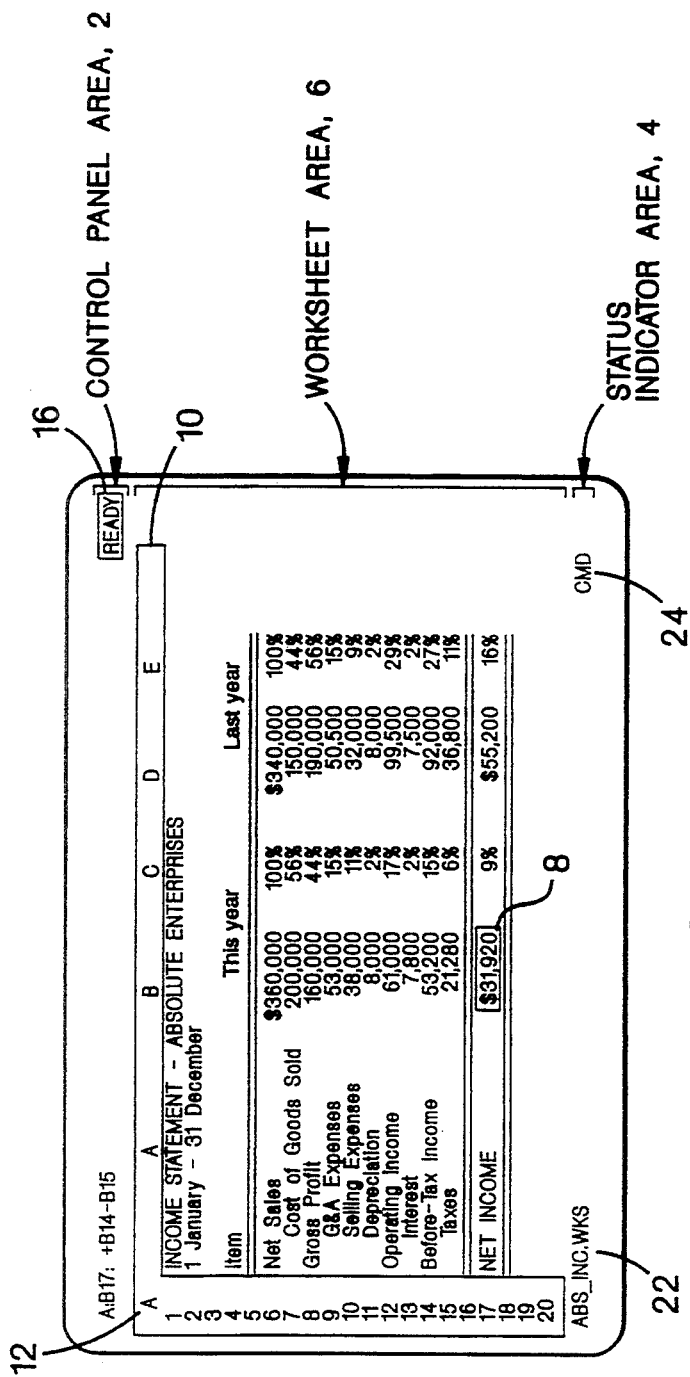
FIG. 1 is an example of a visual display of data in a spreadsheet program.

As shown in FIG. 1, the visual display is divided into three regions, namely, a control panel area 2 that occupies the top three lines of the display, a status indicator area 4 that occupies the bottom line of the display and a worksheet area 6 that occupies all of the lines of the display between control panel area 2 and status indicator area 4. In FIG. 1, worksheet area 6 is displaying a selected portion of a worksheet. The worksheet is a grid consisting of 8,192 rows, labelled 1 through 8,192, and 256 columns, labelled A through IV (i.e., A-Z, AA-AZ, BA-BZ, . . . IA-IV). Each intersection of a row and a column is referred to as a cell and is used to store data that is supplied by the user.

Worksheet area 6 contains a rectangular highlight called a cell pointer 8 which can be moved around the worksheet area to select whatever cell the user wants to work with. Along the left side and the top of the worksheet is a highlighted region in the shape of an inverted "L" that is referred to as a worksheet frame 10. The top and left sides of worksheet frame 10 include column letters and row numbers, respectively, to identify the range of cells that are being displayed in the worksheet area. The upper left hand corner 12 of worksheet frame 10 identifies, also by letter, the worksheet that is being displayed, in this case worksheet "A". There may be a maximum of 256 different worksheets that are open in active memory at any one time.

Every location on the worksheet can be identified by a unique identifier specifying the worksheet letter, the column letter and the row number for that location. Thus, for example, the location of cell pointer 8 in FIG. 1 is A:B17, where the letter before the colon identifies the worksheet, the letter after the column identifies the column and the number identifies the row.

Control panel area 2 displays information about what the program is doing and about the work. On the left side of the first line, there is information about the current cell, i.e, the cell at the location of the cell pointer, and on the right side there is a mode indicator 16. The displayed cell information may include any or all of the following: the address of the current cell, its format, its protection status, the column width of the cell and the data which it contains. In FIG. 1, cell A:B17 contains the formula, +B14−B15, which means subtract the value of cell B15 on the current worksheet from the value of cell B14 to obtain the value for the current cell.

Mode indicator 16 specifies the mode or state of the program. For example, when the program is waiting for the user to enter a command, mode indicator 16 displays READY. While the program is completing a command or a process it displays WAIT. Other modes include: MENU to indicate that the program is displaying a menu of commands, EDIT to indicate that the user is editing a cell entry, LABEL to indicate that the user is entering a label, VALUE to indicate the user is entering a value, ERROR to indicate that the program is displaying an error message, etc.

Figure 2:
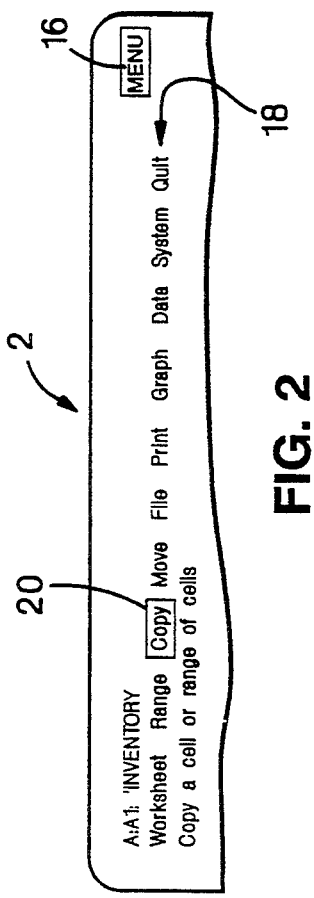
FIG. 2 illustrates the control panel area of the visual display.

The second and third lines of control panel area 2 may or may not display additional information depending upon the mode of the program. For example, in READY mode no information appears on those lines. Whereas, in MENU mode, as shown in FIG. 2, the second line includes a main menu 18 listing options, one of which may be selected by moving a highlight 20 over the selection and entering a return, and the third line displays either information about the highlighted option or a list of subcommands.

Finally, indicator area 4 includes a file-and-clock indicator 22 on the left and a status indicator 24 on the right. If the current worksheet is part of a file, file-and-clock indicator 22 displays the file name otherwise it displays the date and time. Status indicator 24 displays other status information such as CALC, if the program is computing formulas, CMD, if the program is running a macro, etc.

The program has the capability of displaying one, two or three windows on the screen, each of which may be showing the same region of different worksheets or different regions of different worksheets. The two window screen is available either as a vertical split screen in which the two worksheets are displayed side by side or as a horizontal split screen in which one worksheet is displayed above the other. The three window screen is referred to as perspective mode and is illustrated in FIG. 3. In the described embodiment, a single worksheet may be displayed in multiple windows in split window mode. Perspective mode, however, does not permit the same worksheet to be assigned to multiple windows.

Figure 4:
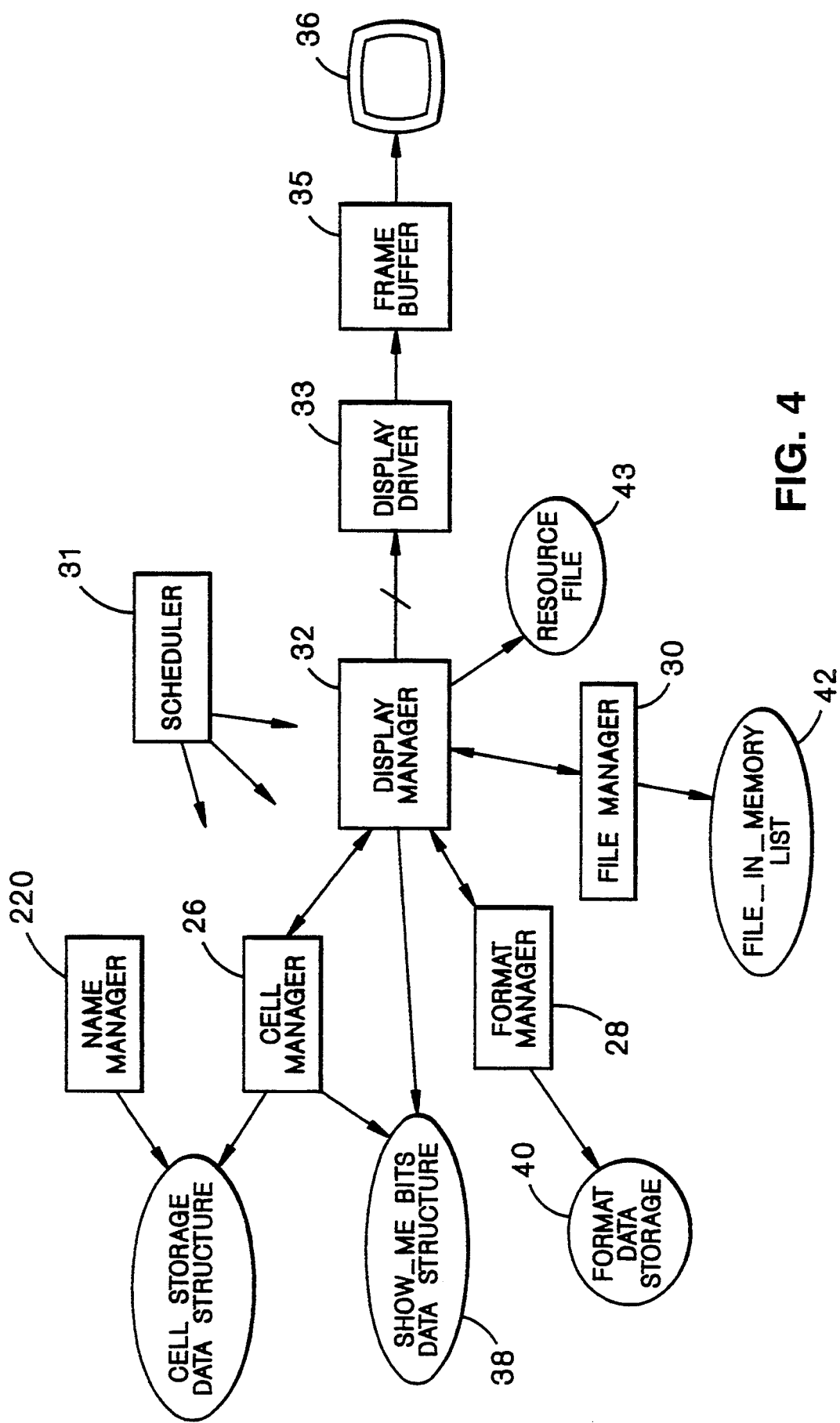
FIG. 4 is a functional block diagram of relevant portions of the spreadsheet program.

Referring to FIG. 4, the spreadsheet program includes the following functional components, namely, a cell manager 26, a format manager 28, a file manager 30 and a display manager 32. Display manager 32 communicates display information to a display driver 33 which, in turn, communicates with a frame buffer 35 that stores the image to be displayed on a screen 36. The following is a more detailed description of each of these functional components.

Cell manager 26 generates and maintains a cell storage data structure 34 for storing the contents of the cells of all of the spreadsheets that have been loaded into or created in active memory. Whenever a user enters new data or a new formulas into a cell of a worksheet in active memory, cell manager 26 updates the corresponding storage location of cell storage data structure 34 to contain the new information. In addition, cell manager 26 computes the values of cells whose values are specified by formulas, and it provides information to display manager 32 that is necessary for displaying cell contents on a screen 36. As will be described in greater detail latter, cell manager 26 also generates a show_me_bits data structure 38 that display manager 32 uses to determine which of the displayed cells on screen 36 must be updated (i.e., redisplayed).

Format manager 28 generates and stores format information in a format data structure 40. The format information primarily relates to presentation aspects of the displayed cell information. For example, the format information relates to whether the cell values are displayed as currencies, whether commas are inserted as thousands separators, the convention for displaying dates, the location of the decimal point, etc. Cell contents that are retrieved by cell manager 26 for display on screen 36 are first passed to format manager 28 before going to display manager 32. Using its stored format information for the cell, format manager 28 determines how the cell contents are to be displayed on the screen and outputs a data string to display manager 32 containing the properly formatted cell contents.

File manager 30 generates a file_in_memory list 42 to keep track of the worksheet files that have been loaded into active memory. Each file represents another set of one or more worksheets, each of which can be accessed and displayed on screen 36 through an appropriate sequence of keystrokes entered by the user.

Finally, display manager 32 manages the display of information on the screen. The display functions within display manager 32 have the responsibility of refreshing the areas of the display for which they are responsible which includes knowing what data for its area has changed. Display manager 32 keeps only minimal information about which areas have been changed.

Display manager 32 includes routines which fall into three categories, i.e., display routines, command routines and query routines. For the most part, the display routines are the only routines that call display driver 33 and command routines do not communicate directly with driver 33. Instead, the command routines communicate with a set of data structures and flags which are used by display manager 32 to determine what information to send to screen 36. Among other things, the data structures and flags (which will be described in greater detail later) identify the worksheet or worksheets that are to be displayed on the screen, specify the layout of all of the worksheets that are in active memory and indicate which parts of the screen must be updated to reflect changes made by the command routines.

The redisplay task is high priority task that, as a rule, cannot be interrupted by other tasks. A scheduler 31 calls the redisplay task which, in turn, calls various identified display routines to update screen 36 during the redisplay cycle. Each successive redisplay cycle occurs about 0.11 seconds after the end of the previous redisplay cycle. During the redisplay cycle, display manager 32 implements whatever changes to the display are indicated by the above mentioned data structures and flags and by show_me_bits data structure 38 that is maintained by cell manager 26. After redisplay is completed, the redisplay task is flagged as "asleep" until the 0.11 second interval elapses. Then, it is again activated so that it can again be called by scheduler 31. In short, the display update is an asynchronous task that is not tied to the calling of the command routines.

Because the display update is an asynchronous task, the display routines do not know about the sequence of events that led to the changes in the display. They do not know how many keystrokes have been received nor what the keystrokes are. All the display routines know about is the cumulative effect on the display of everything that has happened since the display routine was called during the last redisplay cycle. In addition, the display routines update only those portions of the display that have changed since the last redisplay cycle.

That is, the redisplay task does minimal update of the display.

The command routines are the interface to the rest of the program to change the displayed data. In general, the command routines communicate changes to screen 36 by storing information in the data structures and the flags that are maintained by display manager 32. The program executes as many commands as it can within the 0.11 second interval between redisplay cycles. Thus, during each redisplay cycle, display manager 32 updates screen 36 to display the cumulative effect of however many commands the computer could process since the last redisplay cycle. If the commands are being entered by a user through a keyboard, the rate at which commands are executed is likely to be relatively slow and it is unlikely that more than one command will be executed between any two successive redisplay cycles. If, however, a macro is running, the number of commands that are executed in the 0.11 second interval may be much greater than one.

Examples of command routines include:
  enter data
  change the widths of the column/columns
  hide a column
  hide a sheet
  put up a prompt
  update a response
  change the mode indicator
  take down a status indicator
  move the cellpointer
  etc.

The query routines provide information to the rest of the program about the state of the display on screen 36. For example, it may be necessary to know what the location of the cell pointer is on the display. The query routine determines such information from the data structures that are maintained by the display manager and report the information to other parts of the program. Some examples of query routines are:
  return location of cellpointer
  tell me how wide the column is
  return the top left cell currently on the screen In addition to the above mentioned data structures, display manager 32 also has access to a separate resource file 43 containing descriptions of all strings used in the program including those strings for the menus that may be displayed in control panel area 2. A menu consists of a short prompt and long prompt. The short prompt is the string, usually a word, that is used for menu selection. The long prompt is more descriptive of the menu selection items. Each menu is stored in resource file 43 as a resource string identified by a unique identifier. Each stored resource string is compressed using the Huffman compression method. The entire list of available menus is stored in resource file 43 with alternating short and long prompts following each other.

The above mentioned data structures will now be described in greater detail beginning with the data structures maintained by cell manager 26 and format manager 28.

Figure 5:
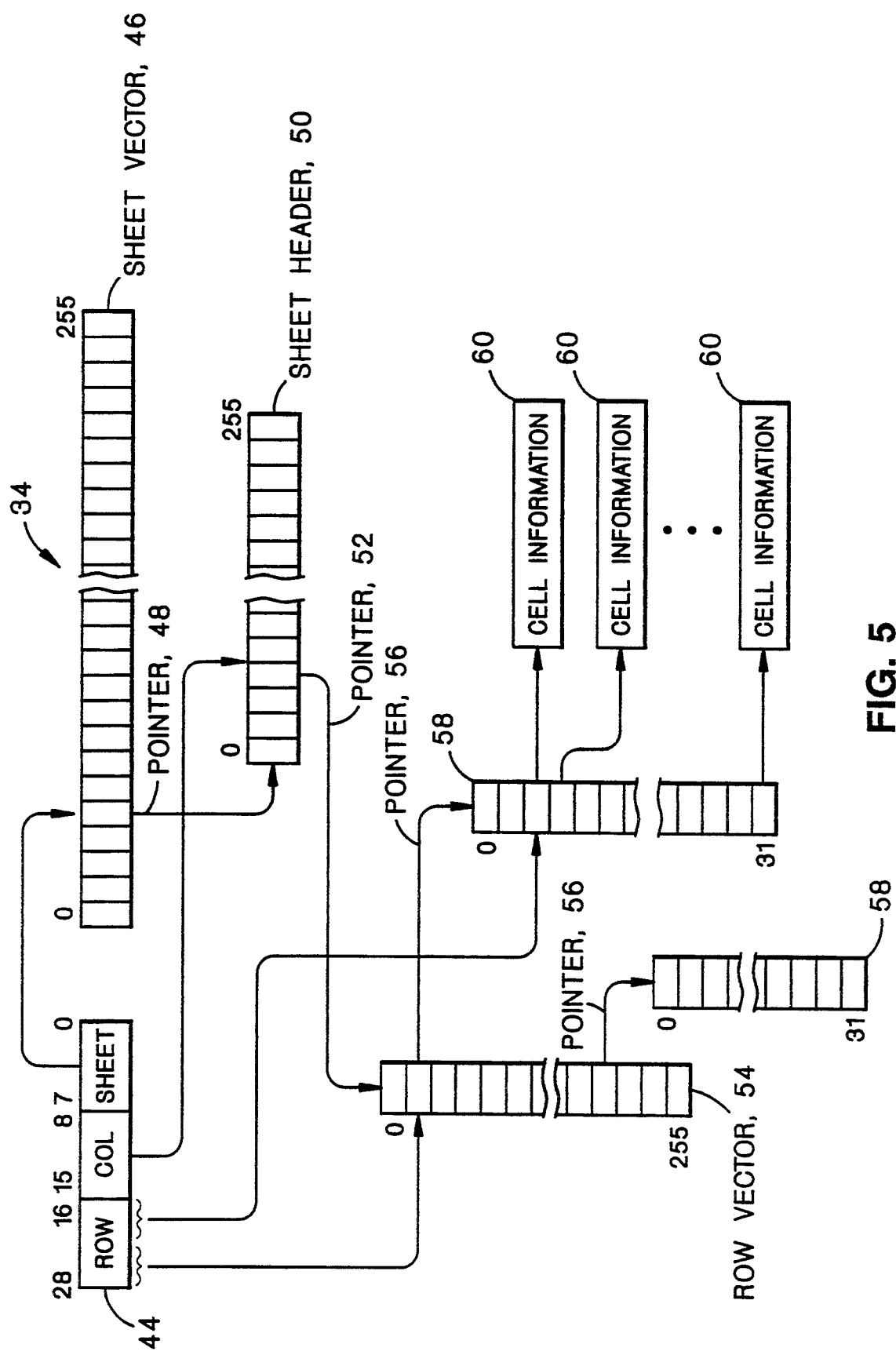
FIG. 5 illustrates the cell storage data structure shown in FIG. 4.

Cell storage data structure 34 and format data structure 40 are sparse arrays. That is, they do not have storage locations in memory for every possible cell location on all of the 256 possible worksheets but rather they only have storage locations for those portions of active worksheets (i.e., worksheets in active memory) that actually contain entries. Referring to FIG. 5, cell storage data structure 34, as is also the case for format data structure 40, is indexed by a 32-bit cell address 44 in which bits 0 through 7 represent the sheet address, bits 8 through 15 represent the column address and bits 16 through 31 represent the row address. Notice that for purposes of display the worksheet is identified by a letter indicating its relative position within a file. The program, however, associates a unique identification number with each worksheet in active memory. It is that unique number that constitutes the sheet address.

Cell storage data structure 34 includes a sheet vector 46 that has 256 storage locations, a different location for each of the 256 possible worksheets that can be stored in active memory. The sheet address portion of cell address 44 identifies one of the 256 storage locations of sheet vector 46. Each storage location of sheet vector 46 contains a pointer 48 to a sheet header 50 for the corresponding worksheet in active memory. If no such worksheet is present in active memory, then that storage location of sheet vector 46 stores a NULL pointer and no sheet header 50 for that worksheet exists.

Sheet header 50 also has 256 storage locations, each of which corresponds one of the 256 possible columns in a worksheet and each of which contains a pointer 52 to a corresponding row vector 54. The column address portion of cell address 44 identifies one of the 256 storage locations of sheet header 50.

Since there is a large number of possible rows (i.e., 8192), the portion of cell storage data structure 34 relating to the row address is hierarchically arranged. In particular, row vector 54 is divided into 256 storage locations, each of which corresponds to a different group of 32 rows (256×32=8192). The upper 8 bits of the row address portion of cell address 44 identifies one of the 256 storage locations of row vector 54. Each storage location of row vector 54 contains a pointer 56. If there are no entries in the worksheet for any of the rows within a group, then pointer 56 for that group of 32 rows is a NULL pointer. On the other hand, if cell storage data structure 34 contains entries for cells in a row within the group, then pointer 56 for that group is to a second level row vector 58 containing 32 storage locations. The lower 5 bits of the row address identifies a corresponding one of the storage locations in this second level row vector 58. Each of the storage locations contains either a NULL pointer or a pointer to cell information 60 for the corresponding cell.

Figure 6:
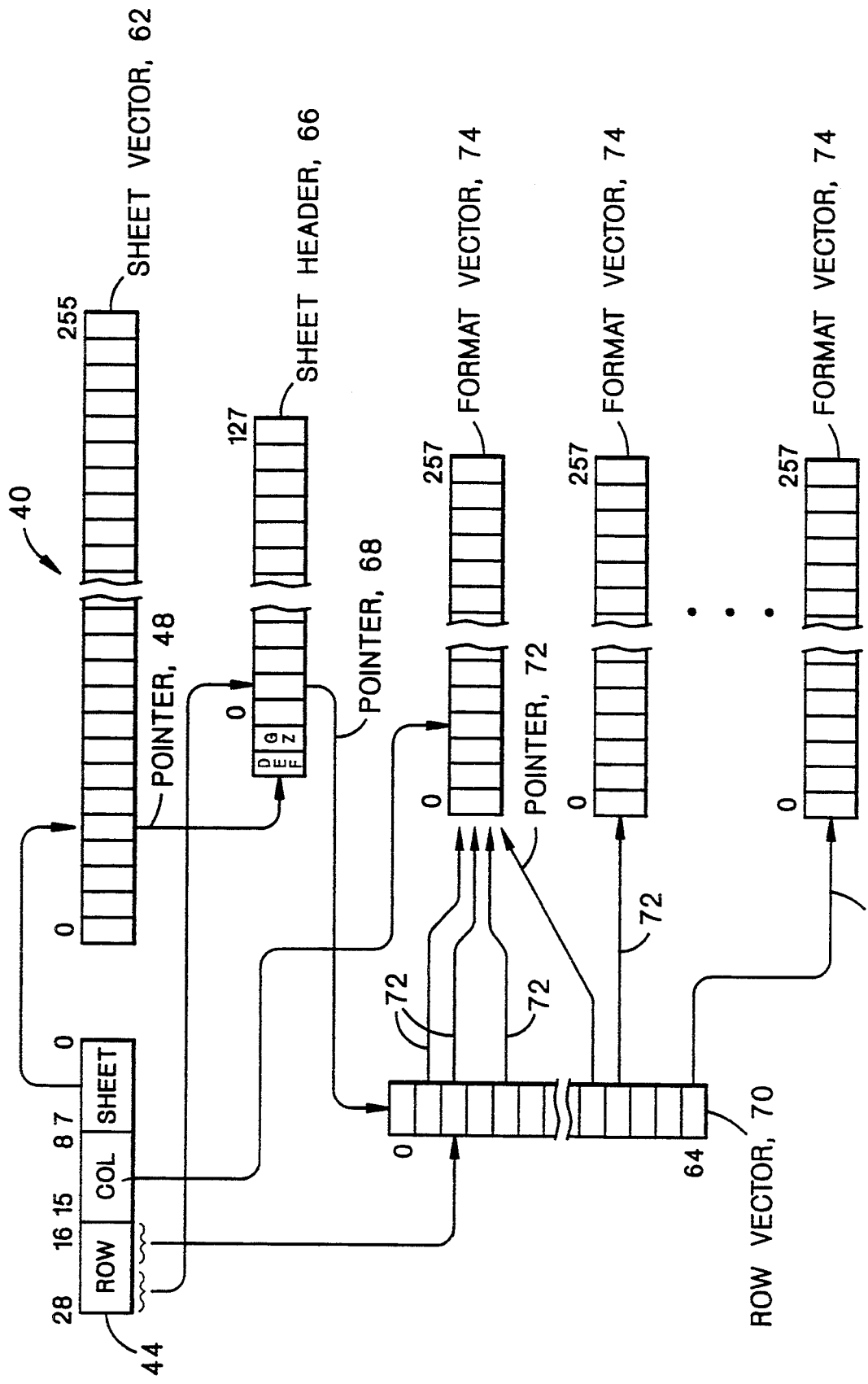
FIG. 6 illustrates the format data structure shown in FIG. 4.

Referring to FIG. 6, format data structure 40 also includes a sheet vector 62 that contains 256 storage locations, one location for each of the 256 possible worksheets. In sheet vector 62, the storage locations are indexed by the sheet address and each location contains a pointer 64, which is either a NULL pointer, if there is no corresponding worksheet in active memory, or a pointer to a corresponding sheet header 66, if there is a corresponding worksheet. Sheet header 66 contains 128 storage locations that are indexed by the upper 7 bits of the row address. Thus, each storage location in sheet header 66 corresponds to a different group of 64 rows. Each storage location also contains a pointer 68 which is either a NULL pointer, if there is no stored format information for any cells found within the corresponding group of 64 rows, or a pointer to a row vector 70, if there is stored format information.

Row vector 70 contains 64 storage locations which are indexed by the lower 6 bits of the row address. Each storage location in row vector 70 contains a pointer 72 which again is either a NULL pointer or a pointer to a format vector 74. Format vector 74 contains format information for each of the columns in the designated row and is indexed by the column address. In the described embodiment, format vector 74 is a run length encoded vector. In addition, if more than one row has the same format as another row, then the corresponding storage locations in row vector 70 will contain pointers to the same format vector 74.

Figure 7:
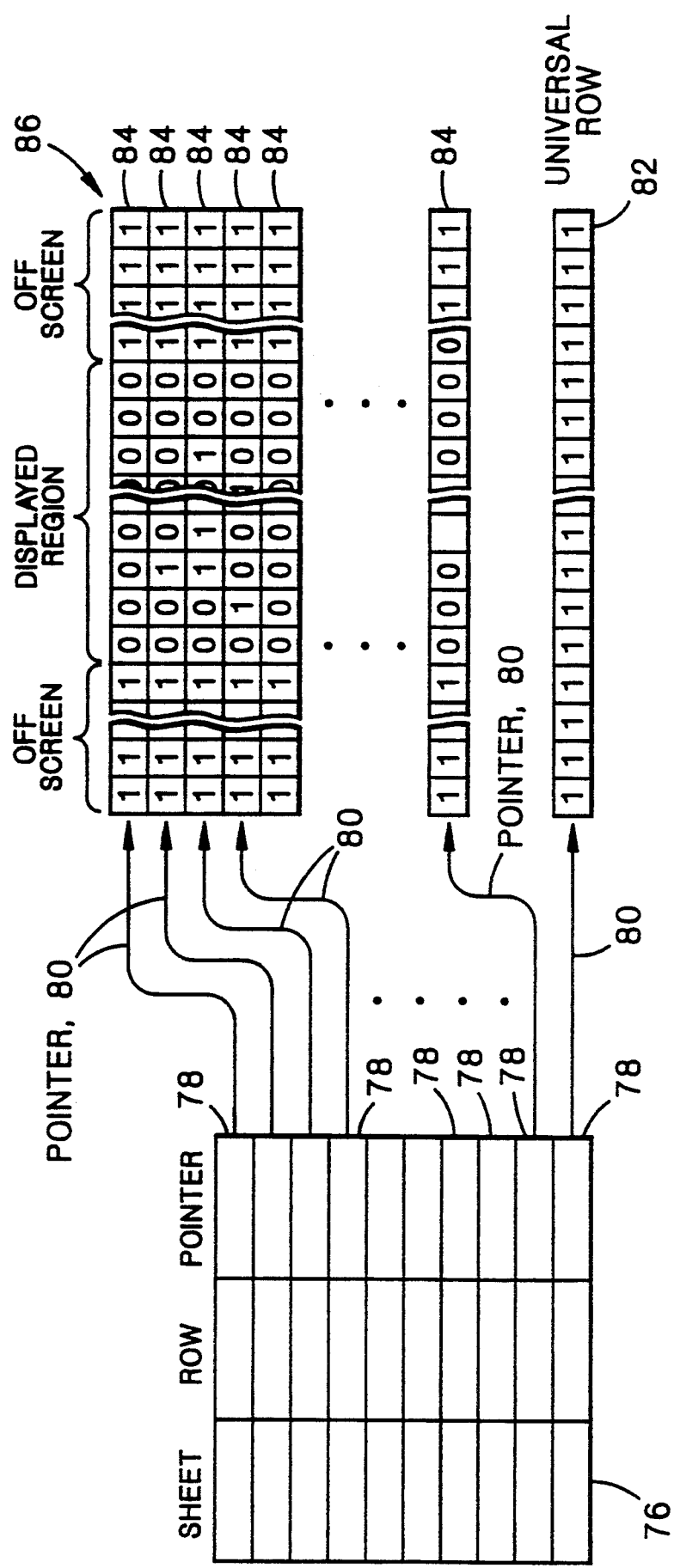
FIG. 7 illustrates the show_me_bits data structure shown in FIG. 4.

Show__me__bits data structure 38, illustrated in FIG. 7, keeps track of which of the displayed cells has changed since the last redisplay and thus it identifies the individual cells that must be redisplayed during the next redisplay cycle. The contents of the cell might have changed because, for example, the user entered new data, a macro altered the cell's contents or a recomputation of a formula in the cell occurred.

In this embodiment, show__me__bits data structure 38 includes a table 76 with 41 storage locations 78 that are indexed by a sheet number and a row number. It is assumed that the display screen permits a maximum of 20 rows of a worksheet to be displayed at one time. Since the described program provides for a vertical split screen display where a different worksheets can be displayed side-by-side, there are 40 rows of cells for which show__me__bit data must be maintained. The table has storage locations for one more row than the maximum number of rows which may be displayed at any one time.

Each storage location 78 in table 76 contains a pointer 80 that either points to a universal row 82 or to a corresponding one of a group of rows 84 of a bit map 86. In the illustrated example, the number of rows in bit map 86 corresponds to the number of rows that were displayed on the screen during the last redisplay cycle and each row 84 of bit map 86 corresponds to a different one of the displayed rows. Table 76 provides an index into bit map 86. Each row 84 of bit map 86 and universal row 82 contains 256 storage locations, each location corresponding to a different one of the 256 possible column addresses. Each of the storage locations of bit map 86 and of universal row 82 contains a show__me bit that indicates whether the corresponding location on the screen should be updated during the next redisplay cycle. A show__me bit that is TRUE (i.e., a 1 bit) indicates that a redisplay of that cell location should occur and a show__me bit (i.e., a 0 bit) that is FALSE indicates that no redisplay of that cell need occur.

All storage locations of universal row 82 and all storage locations in regions of bit map 86 that correspond to off-screen locations contain show__me bits that are always set to TRUE. Whereas, the storage locations of the other regions of bit map 86, i.e., those storage locations corresponding to on-screen locations, contain show me__bits that may be either TRUE or FALSE, depending upon whether the contents of the corresponding cell have changed since the last redisplay.

As already noted, display manager 32 uses show__me__bit data structure 38 to identify the cells which must be redisplayed during the redisplay cycle as a result of being changed. After the stored information has been used for updating the screen and before ending the redisplay cycle, show__me__bit data structure 38 is initialized so that it is again ready to record changes to cells that occur after that redisplay cycle and before the next redisplay cycle. During the initialization, all pointers 80 in table 76 are changed so that they point to universal row 82 and the sheet and row information in table 76 is cleared. Then, the contents of table 76 are updated to identify the sheets and rows that were actually displayed during that redisplay cycle. The information required for this phase of the initialization is contained in other data structures that are maintained by display manager 32 (e.g. window records and a layout data structure) and which will be described shortly.

Next, bit map 86 is generated. That is, for each displayed row, a corresponding row 84 is added to bit map 86 and pointer 80 for the corresponding storage location 78 is changed to point to that new row 84. For each new row 84 added to bit map 86 all show__me bits corresponding to off screen locations are set to one and all show__me bits corresponding to on screen locations are set to zero. Note that if different columns of the same set of rows of a particular worksheet are being displayed in the two windows of a vertical split screen, then two different regions of the corresponding row 84 in bit map 86 will contain zeros. Also note that in some cases, (e.g. the vertical split window example just mentioned) many pointers 80 in table 76 will still point to universal row 82 at the conclusion of initialization.

During the period between display cycles, cell manager 26 (see FIG. 4) updates show__me__bit data structure when appropriate. For example, if the user changes the contents of a cell, cell manager 26 scans table 76 to locate the corresponding location in bit map 86. Cell manager conducts the scan by checking the row number entries in table 76 to identify the first row having the same number as the row of the changed cell. Upon finding a row with the same number, cell manager 26 then compares the worksheet number associated with that row number to the number of the worksheet containing the affected cell. If they are the same, cell manager 26 locates the appropriate storage location in bit map 86 and sets its show__me__bit to one. If they are not the same, cell manager 26 continues its scan down table 76 until it does finally find a row having the correct worksheet number.

Cell manager 26 repeats a similar process each time the contents of a cell in the displayed region of a worksheet are changed.

Figure 8:
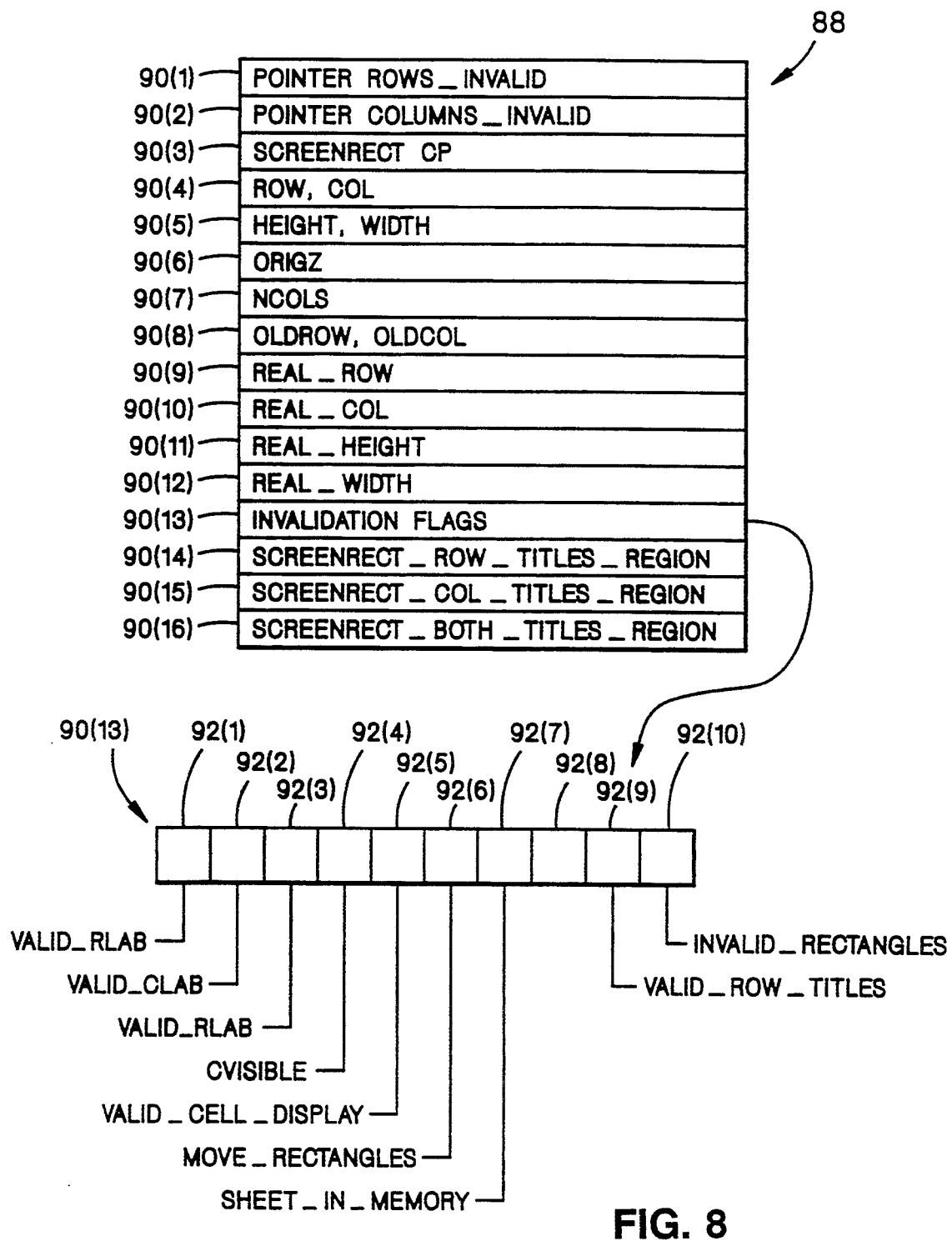
FIG. 8 illustrates the window record data structure that is maintained by the display manager.

Referring now to FIG. 8, display manager 32 maintains a window record 88 for each of the windows that is being displayed. Thus, for example, when in perspective mode, display manager 32 maintains three window records 88. Window records 88 are used by display manager 32 to keep track of the contents of the display and each one contains the information necessary for the display routines to update the display within the corresponding window.

Window record 88 includes at least 16 storage locations 90(1) through 90(16). Storage locations 90(1) and 90(12) each contain a pointer, one pointer to a rows__invalid array and the other pointer to a columns__invalid array. The rows__invalid and the columns__invalid arrays, which will be described in greater detail later, are used by display manager 32 to keep track of how the displayed rows and columns, respectively, have moved since the last redisplay cycle. For example, if the user scrolls through the rows of the worksheet prior to the next redisplay cycle, the rows__invalid array keeps track of which rows will still appear on the screen and where they will be located during the next redisplay cycle.

Storage location 90(3) contains the screen location and size of the cellpointer within that window. If the cellpointer is not within the window, the stored address is a nonexistent location which may be, for example, outside of the permitted worksheet grid area.

Storage location 90(4) contains the screen location of the scrollable origin which is the upper left hand cell of the scrollable region of the window and storage location 90(5) contains the screen size (i.e., the height and width) of the scrollable region. The program offers the capability of defining one or more rows and columns on the top and on the left side of the worksheet, respectively, as title regions. Rows and columns that are thus defined appear in the window as non-scrollable regions and as the user scrolls the display, the title rows and columns remain frozen on the screen. When titles are defined, the size of the scrollable region is smaller than its maximum possible size and the upper left cell location of the scrollable region is the location of the scrollable origin.

The actual screen locations for the row titles region, the column titles region and the corner titles region are computed and stored in storage locations 90(14(, 90(15 and 90(16), respectively. This location information specifies where on the screen the particular window is being displayed, taking into account the offset of the window if it is displayed in either split or perspective mode.

Storage location 90(6) contains the identity (i.e, the number) of the worksheet that is being displayed in that window, also referred to as ORIGZ. As will be described in greater detail, display manager 32 uses ORIGZ to locate the information describing the layout of the selected worksheet.

Storage location 90(7) contains the number of visible columns. Since the column widths can be controlled by the user, this number varies depending upon the widths of the columns in the region of the worksheet that is to be displayed. For any particular displayed region of a worksheet, this number is set so that the maximum number of whole columns is displayed within the available window width.

The real window location and size are stored in storage locations 90(9) through 90(12). Storage locations 90(9) and 90(10) contain the screen locations of the origin row and column, respectively. And storage locations 90(11) and 90(12) contain the actual height and width of the window.

Storage location 90(13) contains an array of invalidation flags that indicates whether particular regions within the window have changed since the last redisplay cycle. These flags inform display manager 32 regarding what regions of the screen need to be updated during the next redisplay cycle and are part of the minimal update feature of this embodiment. Each flag can have one of two states, either TRUE or FALSE. In one state (which may be either TRUE or FALSE, depending upon the particular flag), the flag indicates that a redisplay of the corresponding region is required; whereas, in the other state, the flag indicates a redisplay of the region is not required.

As shown in the enlarged view of FIG. 8, three of the invalidation flags relate to the labels that appear in the worksheet frame, namely, a valid_plab flag 92(1), a valid_clab flag 92(2) and a valid_rlab flag 92(3), which correspond to the sheet, column and row labels, respectively.

A cvisible flag 92(4) indicates whether the cell pointer is visible within the window, i.e. does the worksheet own the cell pointer? If the cvisible flag is TRUE, the actual screen location of the cell pointer is stored in storage location 90(3).

A valid_cell_display flag 92(5) indicates whether everything within the window needs to be redisplayed. If this flag is TRUE, then display manager 32 proceeds with redisplaying all of the cells during the redisplay cycle.

A move_rectangles flag 92(6) indicates whether either of the invalid arrays identified in storage locations 90(1) and 90(2) have been changed since the last redisplay cycle. If move_rectangle flag is FALSE, indicating that the arrays have not been changed since the last redisplay cycle, display manager 32 does not examine the invalid arrays during the next redisplay cycle. Whereas, if move_rectangle flag 92(6) is TRUE, indicating that the arrays have changed, display manager 32 uses the information stored in invalid arrays to achieve minimal update of the screen.

A sheet_in_memory flag 92(7) is used in perspective mode to indicate that there are not sufficient sheets in memory to fill the window. Thus, the windows that have no corresponding worksheets are displayed as empty.

Finally, a valid_row_titles flag 92(9) indicates whether the row titles have changed since the last refresh cycle.

Display manager 32 also keeps at least three additional data structures that relate to window records 88, namely, a win[ ] array, a nwin variable and a cpwin variable. The win[ ] array has three elements win[1], win[2] and win[3], the window records for each of the three windows being displayed. During one-window display, win[0] is the window record assigned to the window and win[1] and win[2] are unused. During horizontal split-windows display, win[0] is the window record for the left window, win[1] is the window record for the right window and win[2] is unused. During vertical split-windows display, win[0] is used for the top window, win[1] is used for the bottom window, and win[2] is unused. Finally, during perspective windows, win[0] is used for the bottom window, win[1] is used for the middle window, and win[2] is used for the top window. The nwin variable indicates whether the display mode is one-window, split-windows or perspective windows. The cpwin variable points to the element of win[ ] which is the window record that currently owns the cell pointer.

Figure 9:
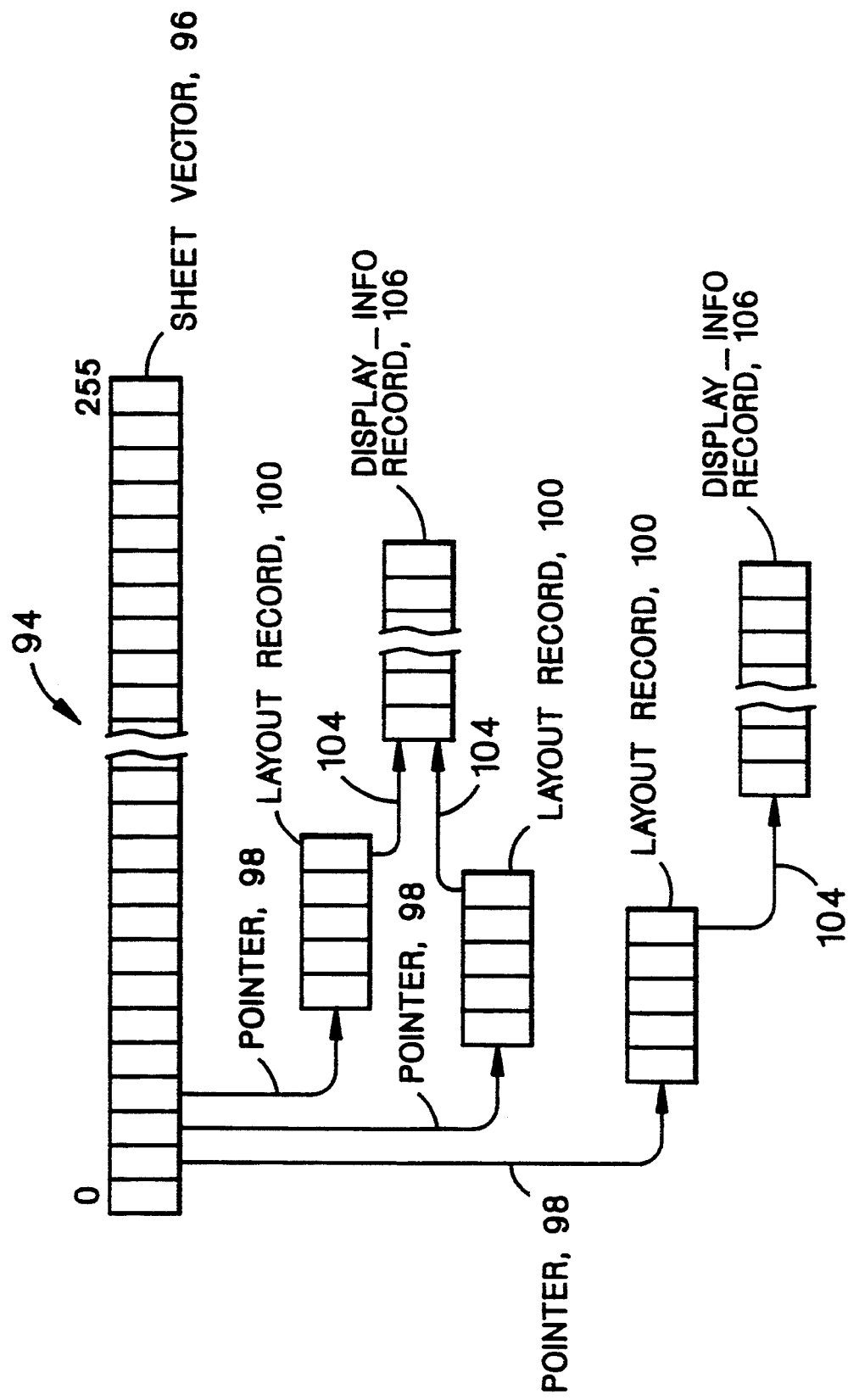
FIG. 9 illustrates a layout data structure that is maintained by the display manager.

Referring to FIG. 9, display manager 32 also maintains a layout data structure 94 that contains layout and display information for each worksheet in active memory. The number stored in storage location 90(7) of window record 88, i.e., ORIGZ, is an index into this layout data structure 94. Layout data structure 94 includes a sheet vector 96 with 256 storage locations that are indexed by worksheet number. Each storage location contains a pointer 98 which is either a pointer to a layout record 100 for the worksheet or a NULL pointer if there is no corresponding worksheet in memory.

Figure 10:
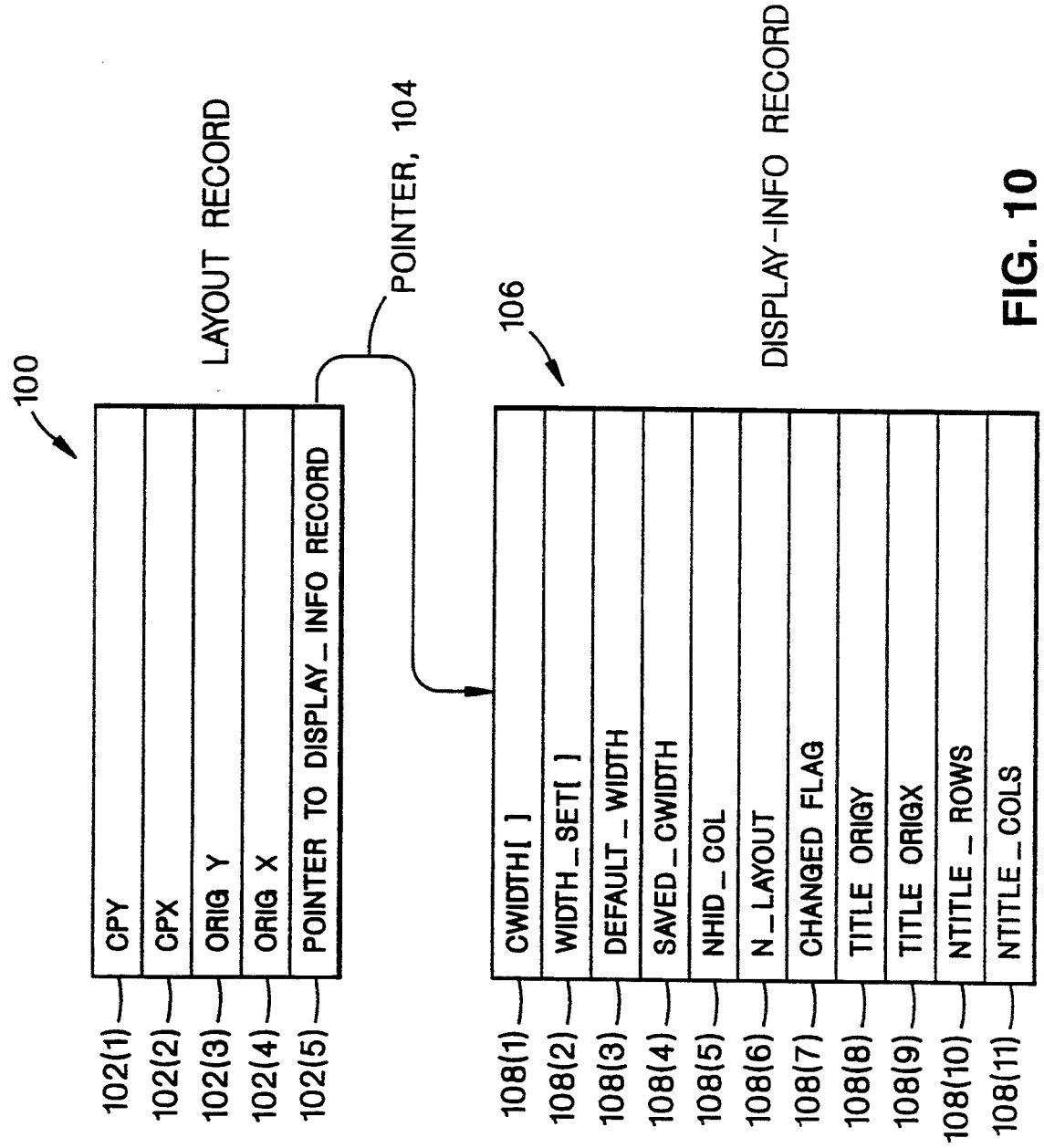
FIG. 10 illustrates the layout and the display_info records that are stored in the layout data structure.

As shown in FIG. 10, each layout record 100 includes five storage locations 102(1) through 102(5). Storage locations 102(1) and 102(2) contain the row and the column, respectively, of the last location of the cell pointer on the worksheet. Storage locations 102(3) and 102(4) contain the first row and the first column, respectively, of the last displayed region of the worksheet. And storage location 102(5) contains a pointer 104 to a display record 106 containing additional information about the worksheet. Layout record 100 contains information that tends to change more frequently during work on the worksheet; whereas, display_info record 106 contains information that tends to change less often. In the described embodiment, layout record 100 is stored in near memory and display_info record is stored in global memory.

Each display_info record 106 contains at least 11 storage locations 108(1) through 108(11). Storage location 108(1) contains an array, referred to as the c_width array, which specifies the widths of all of the columns on the worksheet. Storage location 108(2) contains a bit vector array, referred to as the width_set[ ] array, that identifies all of the columns that do not use the default width. And storage location 108(3) contains the default width for columns on the worksheet, referred to as default_width.

During the redisplay cycle, display manager 32 needs to repeatedly obtain the screen locations of the columns and provide this information to display driver 33. Although this information may be derived from the c_width array stored in display_info record 106 (by summing the column widths for all columns to the left of the relevant column), having to repeatedly translate the column widths stored in the c_width array into the required form would be time-consuming. Therefore, at the beginning of the redisplay cycle for the area requiring the column location information, display manager 32 generates the required screen locations of the columns from the c_width array and stores the results in a temporary data structure, referred to as the col_locations array. Throughout the remainder of the redisplay cycle for that area, display manager 32 references the col_locations array instead of repeatedly computing the required results from the c_width array stored in display_info record 106. This reduces the number of computations required during the redisplay cycle and speeds the redisplay process.

Display record 106 also stores the identities of the first title row and the first title column in storage locations 108(8) and 108(9), respectively. And it stores the number of title rows and the number of title columns in storage locations 108(10) and 108(11), respectively.

Finally, display_info record 106 contains a change flag in storage location 108(7) which indicates whether the display_info record has been modified since the last redisplay cycle.

If more than one worksheet uses the same layout (as defined by display_info record 106), then the layout records 100 for each of those worksheets contains a pointer in storage location 102(5) to the same display_info record. To indicate that more than one worksheet is sharing the same display_info record, display manager 32 stores in storage location 108(6) of the shared display_info record the total number (referred to as N_layout) of worksheets that are using that display_info record. As the number of worksheets using the same display_info record changes, display manager 32 updates N_layout to reflect the change. In addition, if the user modifies the layout of a worksheet and if N_layout equals one, display manager 32 modifies that display_info record without risk of changing the layout for other worksheets. On the other hand, if N_layout is greater than one, display manager 32 creates a new display_info record for the worksheet since others worksheets are relying on the information stored in the original display_info record.

Figure 11:
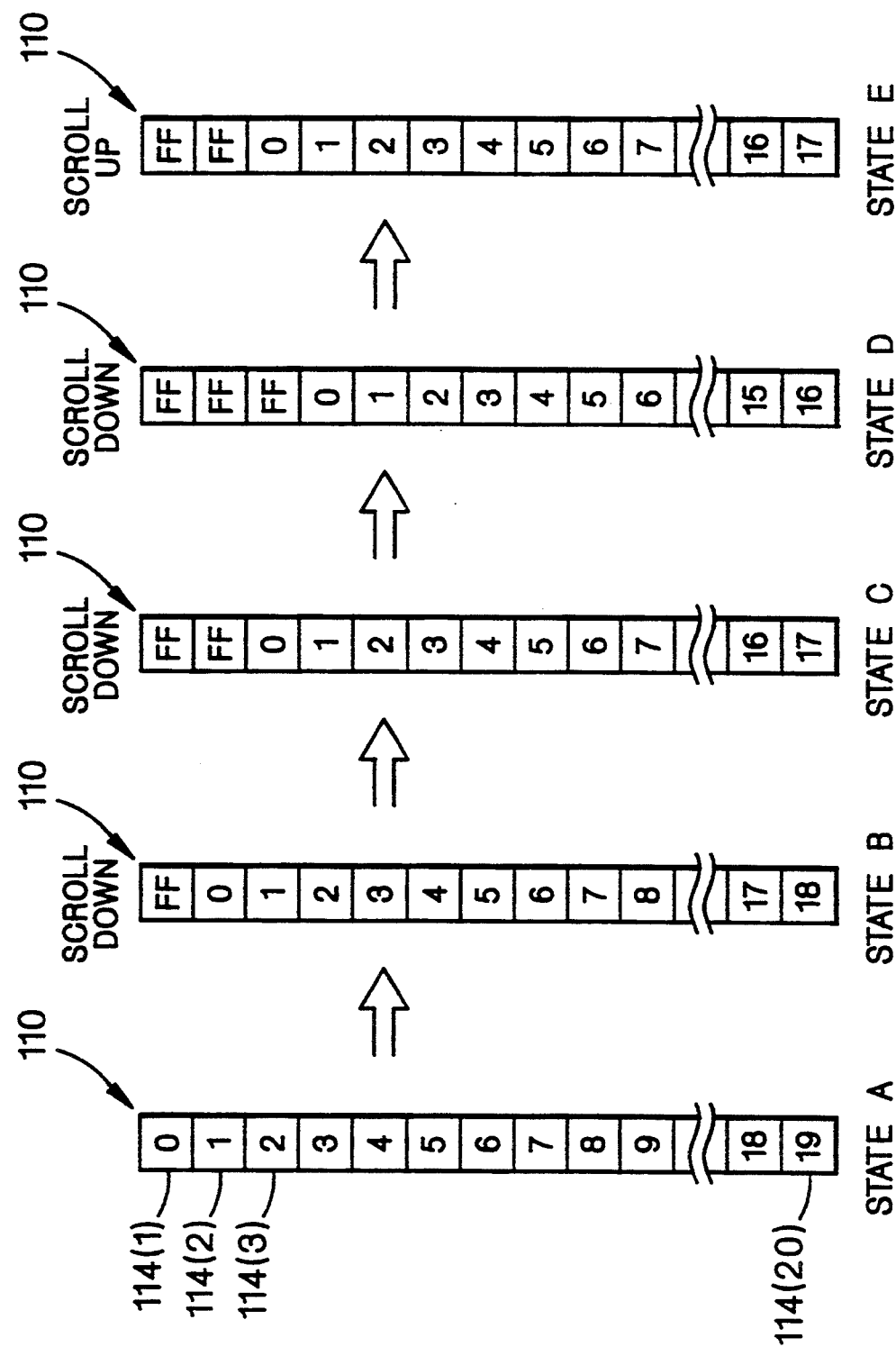
FIG. 11 illustrates the row_invalid array.
Figure 12:
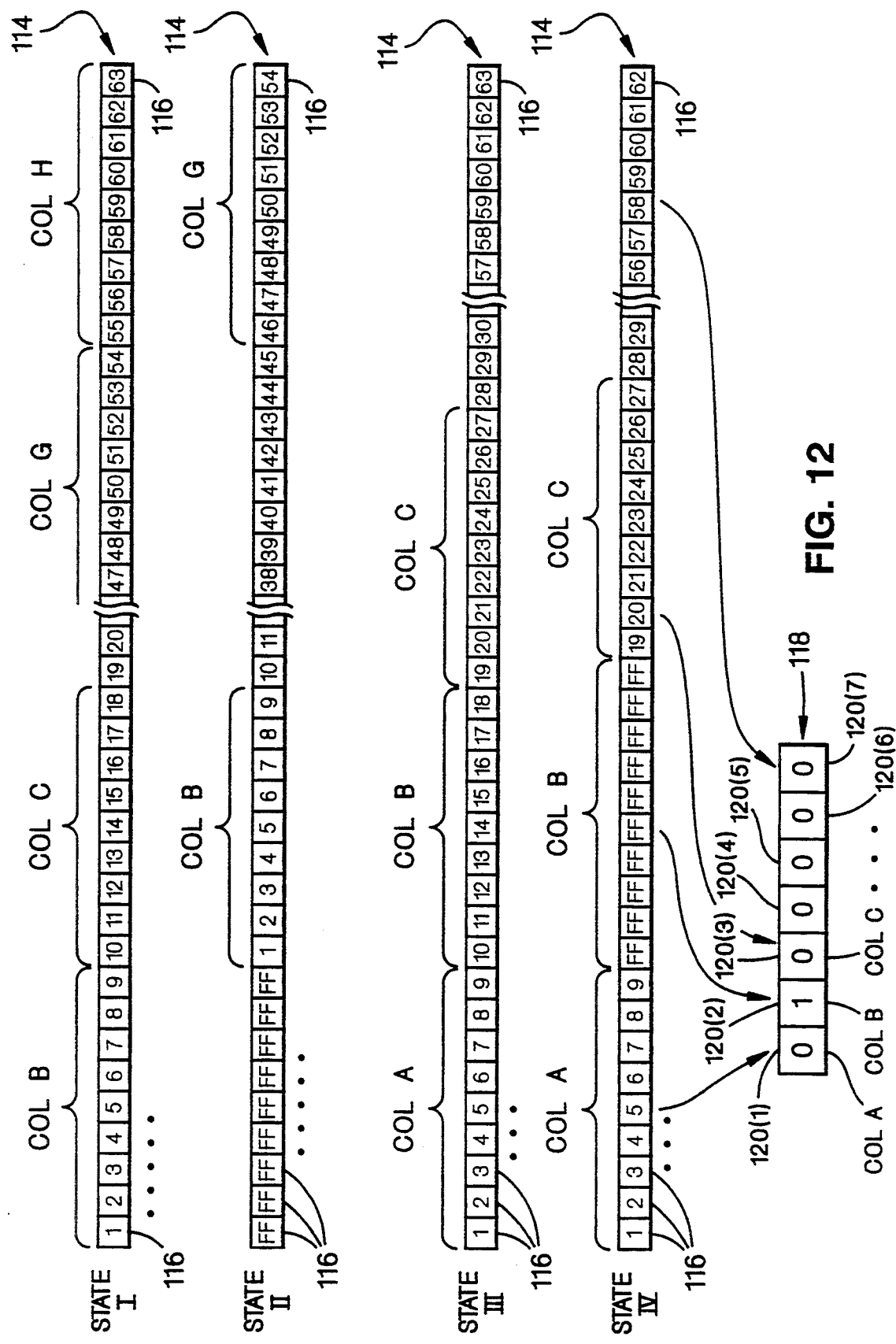
FIG. 12 illustrates the column_invalid array and the cell column_invalid array.

As noted earlier, for each window record, display manager 32 maintains a row_invalid array 110 and a column_invalid array 112 for keeping track of the scrolling of rows and screen columns, respectively. Examples of these arrays are illustrated in FIGS. 11 and 12, respectively.

Row_valid array 110 has N storage locations or elements 114, each of which corresponds to a different row location in the displayed window. There are a sufficient number of elements 114 to represent all of the row locations in the window. The actual size of row_invalid array 112 is dynamically allocated at program startup and is based upon the display driver that is being used (i.e., N equals the total number of rows which can be displayed). There is also a switch driver command for switching to another driver. Executing that command also reallocates memory for row_invalid array 110 if necessary. In the described embodiment, N is equal to twenty, which is appropriate for a typical PC display screen displaying a single window.

Before a redisplay cycle has completed, display manager 32 initializes row_invalid array 110 so that it contains a continuous sequence of integers, starting with zero in the first element 114(1) and ending with 19 in the last element 114(20). Each stored integer corresponds to a different one of the numbered rows that were last displayed in the window. Thereafter and until the display routine is again called to redisplay the window, display manager 32 uses row_invalid array 110 to keep track of which rows will still be displayed on the screen during the next refresh cycle.

Consider the following example of how row_invalid array 110 serves this function. If a user (or a macro program) instructs the cell pointer to move one row above the top most row displayed in the window, this will cause the resulting displayed worksheet region to scroll down one row. Upon receiving this command, display manager 32 records the result by shifting all of the integers of the stored sequence down one element in row_invalid array 110 and by storing an FF (hexadecimal) in element 114(1) (see state labelled B). FF indicates to the display routine that the cells of the corresponding row must be redisplayed (which requires that the cell manager return the cell contents for the corresponding cells). The numbers in the other rows indicate that display driver 33 has already stored the information for those rows in screen buffer 35 and can update the display by merely shifting the stored row data down one row. In other words, cell manager 26 need not retrieve all of the cell information for redisplaying those rows.

Continuing with the example, if it is assumed that the user, or the more likely, the macro is able to execute two more cell pointer move up commands followed by twenty cellpointer move down commands before the next refresh cycle, then row_invalid array 110 will pass through the other states labelled C through E shown in FIG. 11. In response to receiving the second move up command, display manager 32 shifts the integers of the stored sequence down one more element in row_invalid array 110 and stores an FF in the location which was previously occupied by zero, i.e., element 114(2). The third move up command results in moving the stored sequence down one more element in row_invalid array 110 and again storing an FF in the location which was most recently occupied by zero, i.e., element 114(3) (see state labelled D). Since the window contains 20 rows, the screen will not scroll up until the cell pointer tries to move beyond the lowest row in the window. Thus, the next 19 cellpointer move down commands do not affect the contents of row_invalid array 110. In response to receiving the twentieth move down command, however, display manager 32 moves the sequence of integers up one element so that 17 now occupies the lowest element of the array and there are only two elements containing FF at the top of the array (see state labelled E).

When the redisplay cycle occurs, display manager 32 instructs display driver 33 to shift its row data down two rows and then display manager 32 redisplays the top two rows. The sequence of intermediate states of row_invalid array 110 have no affect on the redisplay cycle. It is only the final state of the array that matters. Thus, display driver 33 is not called upon to reproduce what may have been a very complex sequence of scrolling steps since the last redisplay cycle.

Column_invalid array 114, illustrated by FIG. 12, serves the same function as row_valid array 110 but for the columns instead of the rows. Column_invalid array 114, however, is indexed by screen widths rather than cell column widths. (A screen width is defined as the width of a zero on the screen.) Its size, like that of row_invalid array 110 is dynamically allocated prior to the end of each redisplay cycle. Assuming that a single-window display was selected, that the useable display area is 63 screen widths wide and that the default column width is 9 screen widths, display manager 32 generates a column_invalid array 114 such as is illustrated. Column_invalid array 114 has 63 elements 116, each of which contains a different integer of a continuous sequence of integers, starting with one in the first element and progressing up to 63 in the last element (see state I in FIG. 12). Assuming that at the end of the last redisplay cycle, columns B through H were displayed in the window, then indexes 1 through 9 represent column B, indexes 10 through 18 represent column C, etc. as illustrated.

If the cell pointer was left in column B (i.e., the left most displayed column) at the conclusion of the last redisplay cycle and a command is executed to move the cell pointer to column A, display manager 32 records this by shifting the sequence of integers 9 positions to the right within column_invalid array 114. That is, display manager 32 shifts the sequence to the right by an amount equal to the width of column A. The resulting sequence of stored numbers is as shown by state II in FIG. 12. In each of the nine elements that are left empty after such a shift, display manager 32 stores an FF (hexadecimal) to indicate that those positions of the display must be redisplayed during the next redisplay cycle.

In the same way as was previously described for row_invalid array 110, display manager 32 continues to use column_invalid array 114 to keep track of the cumulative effect of the complete sequence of column scrolls that occurs prior to the next refresh cycle. Thus, it is only the final state of column_invalid array 114, i.e, the state of the array at the beginning of the redisplay cycle, that is relevant. The final state indicates which columns can be generated on the screen by merely instructing display driver 33 to shift the image information which is stored in frame buffer 35 and which columns must be redisplayed by calling on cell manager 26 to return the information stored in the relevant cells.

A change of a column width has a similar affect to that of scrolling, namely, some of the previously displayed information is merely shifted on screen 36 to accommodate the changed column size. Display manager 32 uses column_invalid array 114 to keep track of such column width changes and the resulting shifts in screen information. For example, assume that display manager 32 displayed columns A through G during the last redisplay cycle and that the displayed columns used the default width of 9 screen widths. At the conclusion of the last redisplay cycle, display manager 32 initializes column_invalid array 114 so that it contains the integer sequence 1 through 63 as shown by state III in FIG. 12. The first nine elements 116 of array 114 contain integers 1 through 9, representing column A, the next nine elements 116 contain integers 10 through 18, representing column B, etc. If prior to the next redisplay cycle, a command is executed to increase the width of column B to 10 screen widths, display manager 32 responds by modifying column_invalid array 114 as follows. It shifts the sequence of integers representing columns A through G to the right by one element and it stores FF in all of the elements that now represent the new column B. The resulting stored sequence is shown by state IV in FIG. 12.

Assuming no other commands were executed that further modified column_invalid array 114, during the next redisplay cycle, display manager 32 uses the array information to determine which portions of the information stored in screen buffer 35 may be used for the next display. In this example, display manager 32 instructs display driver 33 to shift the image information that was previously displayed in screen column locations 19 through 63 to the right by one screen width and to continue displaying that information. Since there are FF's stored in a segment of array 114, display manager 32 calls for a redisplay of the corresponding region of the screen, which involves retrieving the cell contents from cell manager 26, passing them to format manager 28 and sending the data string of formatted information to display driver 33.

During the redisplay cycle, display manager 32 must repeatedly reference the information available in the column_invalid array but requires the information in terms of cell coordinates rather than screen coordinates. Thus, to facilitate the redisplay process, display manager 32 translates the information contained in cell_column array 114 from screen coordinates to cell coordinates and stores the information in a cell_column_invalid array 118 such as is also shown in FIG. 12. Generating cell_column_array 118 early on in the redisplay cycle eliminates the computational overhead associated with having to repeatedly translate column_invalid array 114 into the desired coordinates system.

In the described embodiment, cell_column_invalid array 118 has seven elements 120(1–7), one for each of the displayed columns. First element 120(1) corresponds to elements 1 through 9 of column_invalid array 114, second element 120(2) corresponds to the set of elements of column_invalid array 114 that are associated with column B (i.e., the elements containing FF), etc.

Display manager 32 sets a flag in each element of cell_column_invalid array 118 in accordance with the information that is stored in the corresponding sequence of elements in column_invalid array 114. The flag indicates whether or not the column must be redisplayed. Recall that it must be redisplayed if, for example, its width changed since the last redisplay cycle or if it newly appeared on the screen since the last refresh cycle due to scrolling. Thus, if there is an FF stored in any of the corresponding elements of column invalid array 114, display manager 32 sets the flag to TRUE.

Whereas, if a valid integer sequence occupies the corresponding elements of column_invalid array 114, then display manager 32 sets the flag to FALSE. In performing this translation, display manager 32 relies upon the cell width information stored in the display_info record for that worksheet (see FIG. 10).

Figure 13:
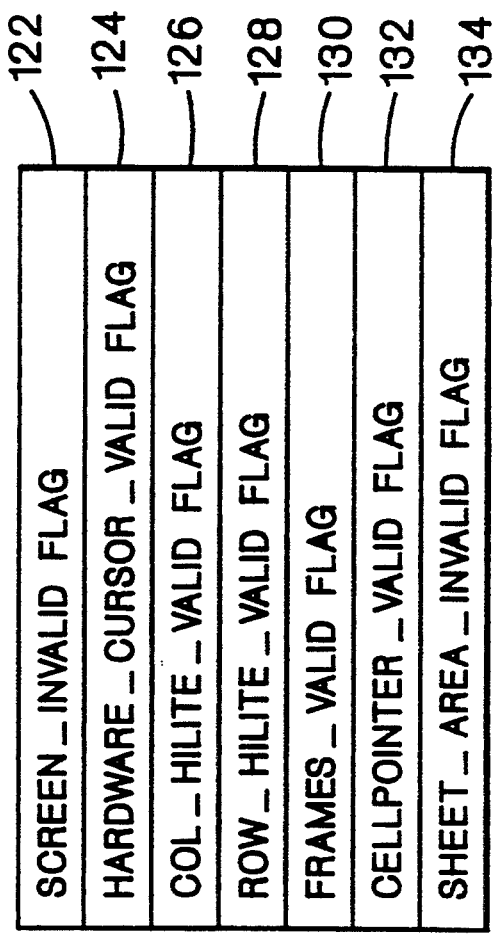
FIG. 13 illustrates global flags that are maintained by the display manager.

Display manager 32 also maintains a set of global flags to keep track of whether certain portions of the display have changed since the last redisplay cycle. These global flags are maintained in near memory and are not accessible by other parts of the system. As shown in FIG. 13, one global flag is a screen_invalid flag 122 which is used to invalidate the entire display. When the user completely changes the display by, for example, calling up a help screen to replace a displayed worksheet, display manager sets the screen_invalid flag to TRUE. Then, during the redisplay cycle, upon detecting that screen_invalid flag is TRUE, display manager 32 instructs display driver 33 to erase screen 36 and then it invokes a help screen display routine to redisplay the entire screen.

Another global flag is a hardware_cursor_valid flag 124. This flag indicates whether the cursor has been changed since the last redisplay and thus whether it must be erased and redisplayed during the next redisplay cycle.

There are two flags that relate to the highlights that appear within a frame to identify the location of the cell pointer within the window. One highlight appears along the left side of the frame to identify the row and the other appears along the top of the frame to identify the column. The flags include a col_hilite_valid flag 126 and a row_hilite_valid flag 128 corresponding to the column highlight and the row highlight, respectively. If, for example, the column screen position of the cell pointer is changed, display manager 32 sets col_hilite_valid flag to FALSE. Such a change would occur if, for example, the cell pointer is moved from within the window or if it is moved to a new window. The FALSE setting indicates that the during the next redisplay cycle, display manager 32 must erase the old cell pointer highlight on the top of the frame for the window containing the cell pointer and redisplay the highlight in a new location.

ROW_hilite_valid flag 128 serves the same function but for the row position highlight instead of the column position highlight.

Another global flag is a frames_valid flag 130. This flag indicates whether a frame in any of the displayed windows has changed and thus must be redisplayed.

Other global flags include a cellpointer_valid flag 132 which indicates whether the position of the cell pointer has changed and a sheet_area_invalid flag 134 which indicates whether all of the displayed cells within the scrollable area have changed.

Each of the above-described global flags, if set to indicate that the corresponding area of the display has changed since the last redisplay cycle, causes display manager 32 during the next redisplay cycle to redisplay the corresponding portion of screen 36. After each of the flags has been examined and before completing the redisplay cycle, all of the flags are initialized to reflect that the display has been updated and so that they may be used to record changes that occur during the following period prior to the next redisplay cycle.

For the mode indicator in the control panel area, display manager 32 maintains two data structures, namely, a mode_show data structure and a mode data structure. The mode_show data structure contains the identity of the mode indicator that was displayed during the last redisplay cycle and the mode data structure contains the desired state of the mode indicator for the next redisplay cycle.

Figure 14A:
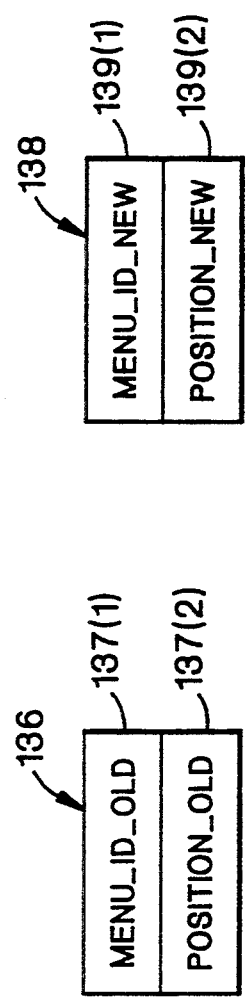
FIGS. 14a and 14b illustrate data structures relating to the control panel and the indicator areas of the visual display.

For the menu in the control panel area, display manager 32 uses a representation that includes a menu identifier and the menu highlight position, specified as an offset from the beginning of the string representing the menu. Referring to FIG. 14a, display manager 32 maintains two data structures, namely, a menu_old data structure 136 that records what was displayed during the last redisplay cycle and a menu_new data structure 138 that keeps track of the changes that occur to the menu area during the period between redisplay cycles. Menu_old data structure 136 contains two entries 137(1) and 137(2). Entry 137(1) is the identifier of the menu displayed during the last redisplay cycle (referred to as menu_id_old) and entry 137(2) is the position of the menu highlight during the last redisplay cycle. Menu_new 138 contains corresponding entries 139(1) and 139(2) (referred to as menu_id_new and position_new, respectively) that are used by display manager 32 to record the most current state of the menu between redisplay cycles. Each time that display manager 32 receives a command to modify the menu area, it records the change in menu_new data structure 138.

During the redisplay cycle, display manager 32 compares the contents of menu_old and menu_new data structures 136 and 138. If they are the same, redisplay of the menu area is not required. On the other hand, if they are different, redisplay is required and display manager 32 redisplays the menu area on the basis of what is stored in menu_new data structure 138. The redisplay process involves instructing display driver 33 to erase the outdated menu information and then write new data to the screen for the affected area of the menu area. The string specifying the new data is retrieved from resource file 43. After the redisplay of the menu area done, the contents of new_menu data structure 138 are loaded into menu_old data structure 136 so that at the conclusion of the redisplay cycle both data structures contain identical information.

Figure 14B:
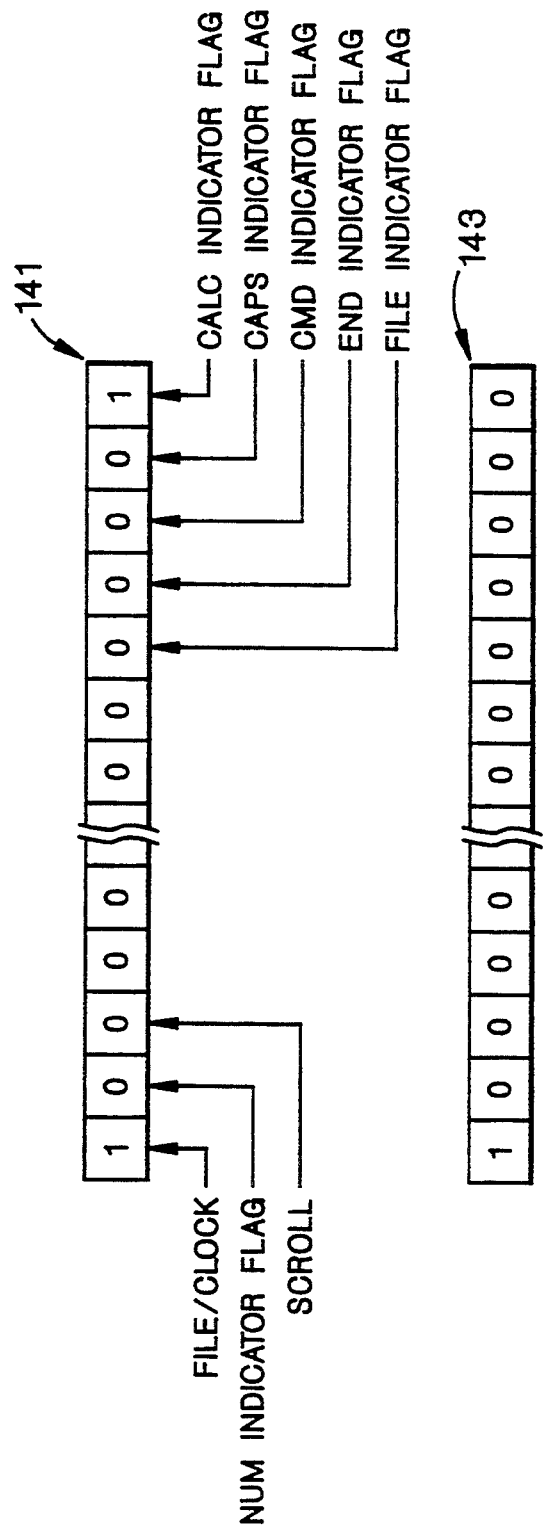

Referring to FIG. 14b, indicator area 4, like the menu area, is also represented within display manager 32 by simple data structures, namely, an old_locator array 141 and a new_locator array 143. Each of these arrays includes a string of 13 bits, each bit position corresponding to a different one of the 13 possible status indicators that can be displayed in the indicator area. A one stored in a bit position of either array indicates that the status indicator corresponding to that bit position is displayed and a zero indicates that the status indicator is not displayed. Old_locator array 141 records the state of the indicator area at the conclusion of the last redisplay cycle and new_locator array 143 keeps track of the most current state of the indicator area. During the redisplay cycle, display manager 32 exclusive OR's the contents of the two 13 bit strings. If the result is a string of zeros, the indicator area need not be redisplayed. If a one bit appears at any location of the array, the status indicator corresponding to that bit position must be redisplayed. Prior to completing the redisplay cycle, display manager 32 updates old_locator array 141 to contain the same information as new_locator array 143.

After describing the last functional block identified in FIG. 4, namely, file manager 30, the details of how display manager 32 uses the above described data structures will be presented.

Figure 15:
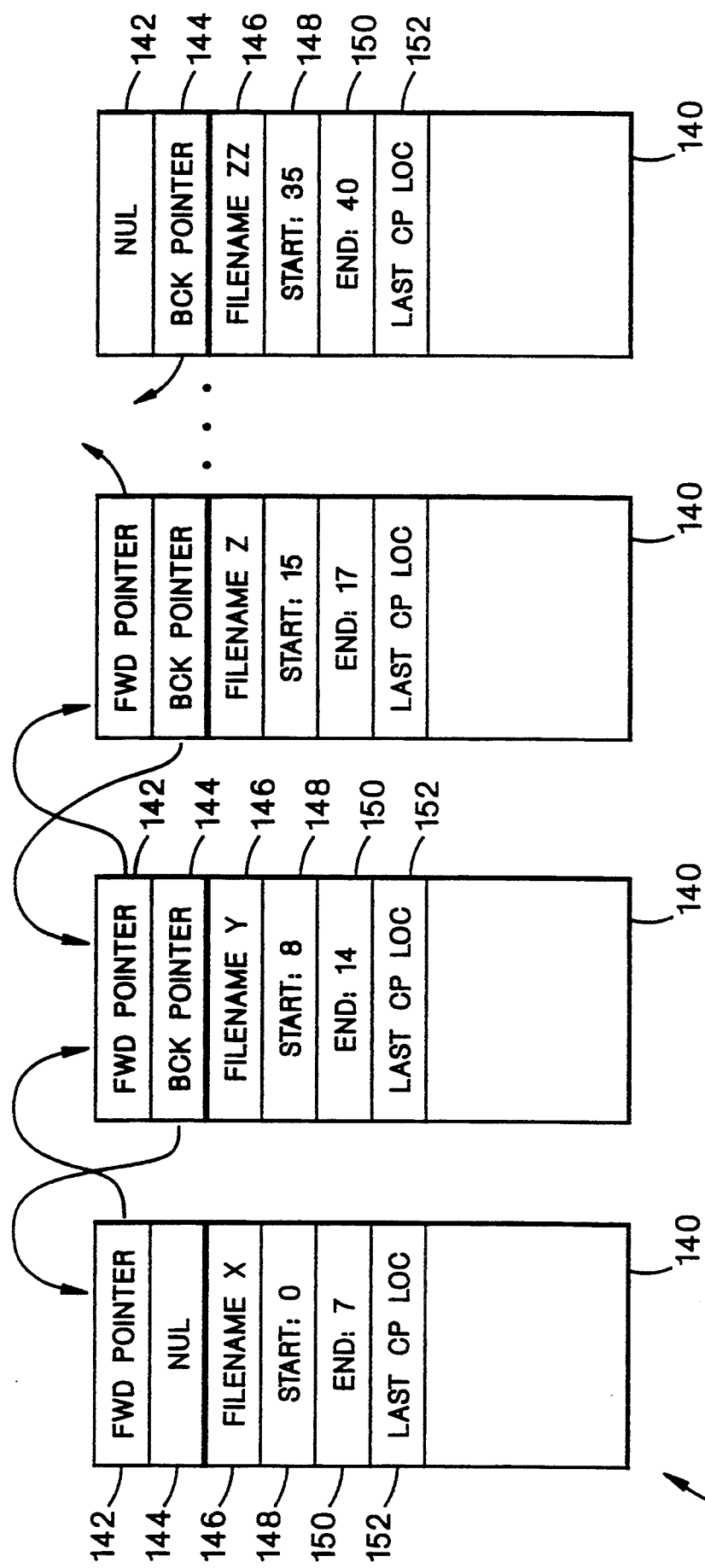
FIG. 15 illustrates the file_in_memory list that is maintained by the file manager.

File manager 30 maintains a record of all files (and all worksheets) that are in active memory in file_in_memory list 42 (see FIGS. 4 and 15). File_in_memory list 42 is an ordered double linked list of file records 140, each file record 140 representing a different one of the files in active memory. Each file record 140 includes a file header that contains a forward pointer 142, which points to the next file record in the list, and a backward pointer 144, which points to the preceding file in the list. Backward pointer 144 in the first file record of the list is a NULL pointer, indicating that no files precede that one. And forward pointer 142 in the last file of the list also is a NULL pointer, indicating that no files follow that one.

Each file record 140 also contains the filename for the file (in storage location 146), the number of the first worksheet within that file (designated start:#) (in storage location 148) and the number of the last worksheet within that file (designated end:#) (in storage location 150). File manager 30 numbers the worksheets in the order of their position within the list. Thus, the start number, identifying the number of the first worksheet in a file, is one greater than the end number in the previous file.

In addition to the information relating to the ordering of the files, each file record also contains other file specific information. For example, in storage location 152, each file record 140 contains the number of the worksheet within that file that last owned the cell pointer. When the user leaves a file, this number is updated to identify the last sheet the user was displaying and when the user returns to the file, the worksheet that is first displayed is the one identified by this number. Other file specific information stored in each file record 140 includes various file attributes, whether there is a reservation on the file, and whether the file has been changed since it was brought in from the disk.

The program permits the user to insert a file at any location in file_in_memory list 42, i.e., at the beginning of the list, between two other active files or at the end of the list. When a file is inserted between two other active files, file manager 30 creates a file record 140 for the incoming file and stores in that newly create file record forward and backward pointers 142 and 144 which point to the next file record and the preceding file record, respectively. File manager 30 also updates forward pointer 142 in the preceding file record and backward pointer 144 in the next file record so that they both point to the newly created file record. In addition, the worksheets within the newly inserted file are assigned identification numbers which sequentially follow the identification numbers that were assigned to the preceding file record. That is, file manager 30 assigns a start number to the inserted file record which is equal to the end number in the preceding file record plus one. And, assuming there are N worksheets in the inserted file, file manager 30 assigns an end number to that file is set equal to its start number+N−1. File manager 30 also revises the start and end numbers for all of the subsequent file records in the list by adding N to their previous values.

As part of the file insertion process, all other subsystems are called upon to update their data structures to reflect the fact that new worksheets have been added and that the identification numbers of previous worksheets have been changed. Thus, for example, sheet vector 46 in the cell storage data structure 34 is updated (see FIG. 5). This updating process involves shifting the pointers for all affected worksheets to the right by N storage locations (i.e, to higher numbered locations) and inserting pointers to newly created sheet headers 50. Other data structures which are similarly updated include format data structure 40 (see FIG. 6) and layout data structure 94 (see FIG. 9). In addition, the window record(s) (see FIG. 8) are updated to point to the last displayed worksheet in the newly inserted file so that during the next redisplay cycle the screen will updated to display the worksheet that the user was working on when last in that file.

Operation

System scheduler 31 (see FIG. 4) repeatedly cycles through a schedule of tasks, calling each of the tasks in succession. The redisplay task is at the top of the list and always has a higher priority than all other tasks in the list. That is, it can interrupt other routines but it cannot be interrupted by other routines. Once called, the redisplay task calls in succession three other routines that are responsible for the display. Each of the other display routines is represented in a list by a pointer to that routine. Thus, display routines are added to the redisplay task by changing a pointer in the list to point to that routine. If no corresponding routine is being called for that position in the redisplay list, then the pointer is a null pointer. After the redisplay routine has been called and its associated display routines fully executed, it is put to sleep for about 0.11 seconds. During its sleep time, system scheduler 31 calls other routines in its task list. After the sleep time for the redisplay task elapses, the system scheduler again calls it possibly interrupting another pending task. As a rule, however, if another task is running, it can refuse to yield to the redisplay task in which case the redisplay task waits until that routine finishes.

Figure 16:
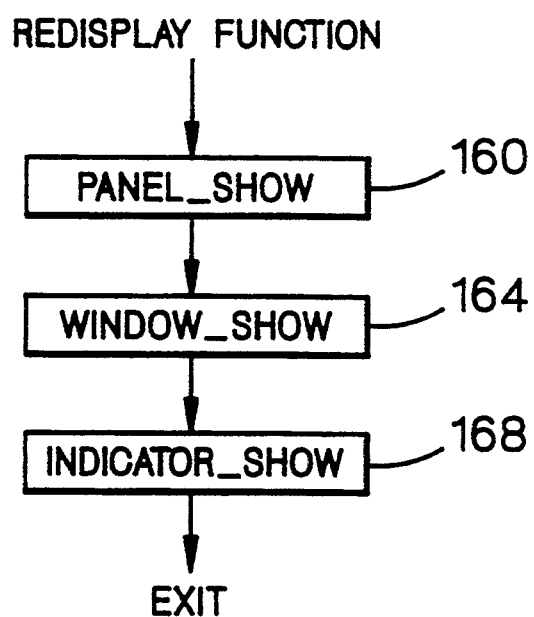
FIG. 16 is a functional diagram of the redisplay process.

Referring to FIG. 16, the responsibility for the redisplay task is divided among three different redisplay routines, namely, a panel_show routine 160, a window_show routine 164 and an indicator_show routine 168. Each of these default routines is responsible for updating a different corresponding area of the display, namely, the control panel area, the worksheet area and the indicator area, respectively. These routines serve as the default routines for the redisplay task and are called indirectly through pointers to the routines. That is, display manager 32 supplies pointers to these routines to the redisplay task unless directed to do otherwise. If the pointer is a NULL pointer, then the redisplay routine for that area is not called. If no routine for a given area of the display is called then that area remains frozen on the screen. That is, display driver 33 continues to display the information that was displayed during the last redisplay cycle.

A different display may be generated by supplying a pointer to another display routine to the display manager. For example, to generate a help display, a pointer to a help display routine is supplied to the redisplay task. Then, when the redisplay task is called, it passes control of the display process over to the help display routine. Thus, in the case of a help display routine, it will typically erase the prior display and cause the requested help menus to be displayed.

In general, each of the default routines relies upon the previously described global flags and the display related data structures to determine whether its display area has changed since the last redisplay cycle. If it has, the display routines rely on the contents of the data structures to determine what on the screen requires redisplay. The operations performed by each of the default routines will now be described in greater detail.

When panel_show 160 is called, it checks screen_invalid flag 122 (see FIG. 13). If screen_invalid flag 122 is TRUE, indicating that the entire screen has been changed since the last redisplay cycle, panel_show 160 redisplays the entire control panel area, relying on the information stored in menu_new data structure 138 and mode data structure to determine what information should be sent to display driver 33. The redisplay process involves erasing the previously displayed information that appeared in the control panel area and displaying new information there.

If screen invalid flag 122 is FALSE, panel_show 160 compares the data structures that indicate what is being displayed with data structures that indicate what should be displayed to determine whether any redisplay needs to occur for portions of the control panel area. Among others, the routine compares the mode_show and mode data structures to determine whether the mode indicator must be updated, and it compares menu_new data structure 138 and menu_old data structure 136 to determine whether portions of menu must be redisplayed. Where differences appear, panel_show 160 redisplays the corresponding portions of the display using information stored in the mode and/or menu_new data structures.

When window_show 164 is called, it loops over all of the active windows to display each in turn. For each window, window_show 164 calls other subroutines that are responsible for separately updating the window frame, the cell data and the cell pointer for the window.

In the case of the window frame, the responsible routine checks at least three flags in the following order: screen_invalid flag 122, sheet_area_invalid flag 134 and frames_valid flag 130. If any of these flags indicate that a change in the display has occurred since the last redisplay cycle, the routine proceeds directly with redisplaying the entire window frame based upon the information stored in window record 88 (see FIG. 8) and the associated layout and display_info records (see FIGS. 9 and 10). On the other hand, if the above-mentioned checked flags do not require a redisplay, display manager 32 checks the appropriate invalidation flags located in storage location 90(13) of the window record to determine where changes have occurred and redisplay is required. In particular, display manager 32 checks the valid_plab, the valid_clab, and the valid_rlab flags. If the valid_rlab flag is FALSE, indicating the row labels require redisplay, display manager 32 uses row_invalid array 110 to determine which portions of the frame must be redisplayed and which portions need not be redisplayed. If the column labels have changed, display manager 32 generates cell_col_invalid array 118 from column_invalid array 114 to identify which column titles still appear on the display and which must be redisplayed.

As part of the frames redisplay subroutine, display manager 32 also checks col_hilite_valid flag 126 and row_hilite_valid flag 128 to determine whether the highlight for the cell pointer must be redisplayed in either the top or the left side of the frame, respectively. If either of these flags are FALSE, indicating that the corresponding highlight has changed since the last redisplay cycle, display manager 32 erases the previous highlight, checks the cpwin data structure to determine whether the cell pointer is in that window, and if it is, redisplays the cell pointer highlights based upon the new location of the cell pointer as provided by the window record.

Figure 17:
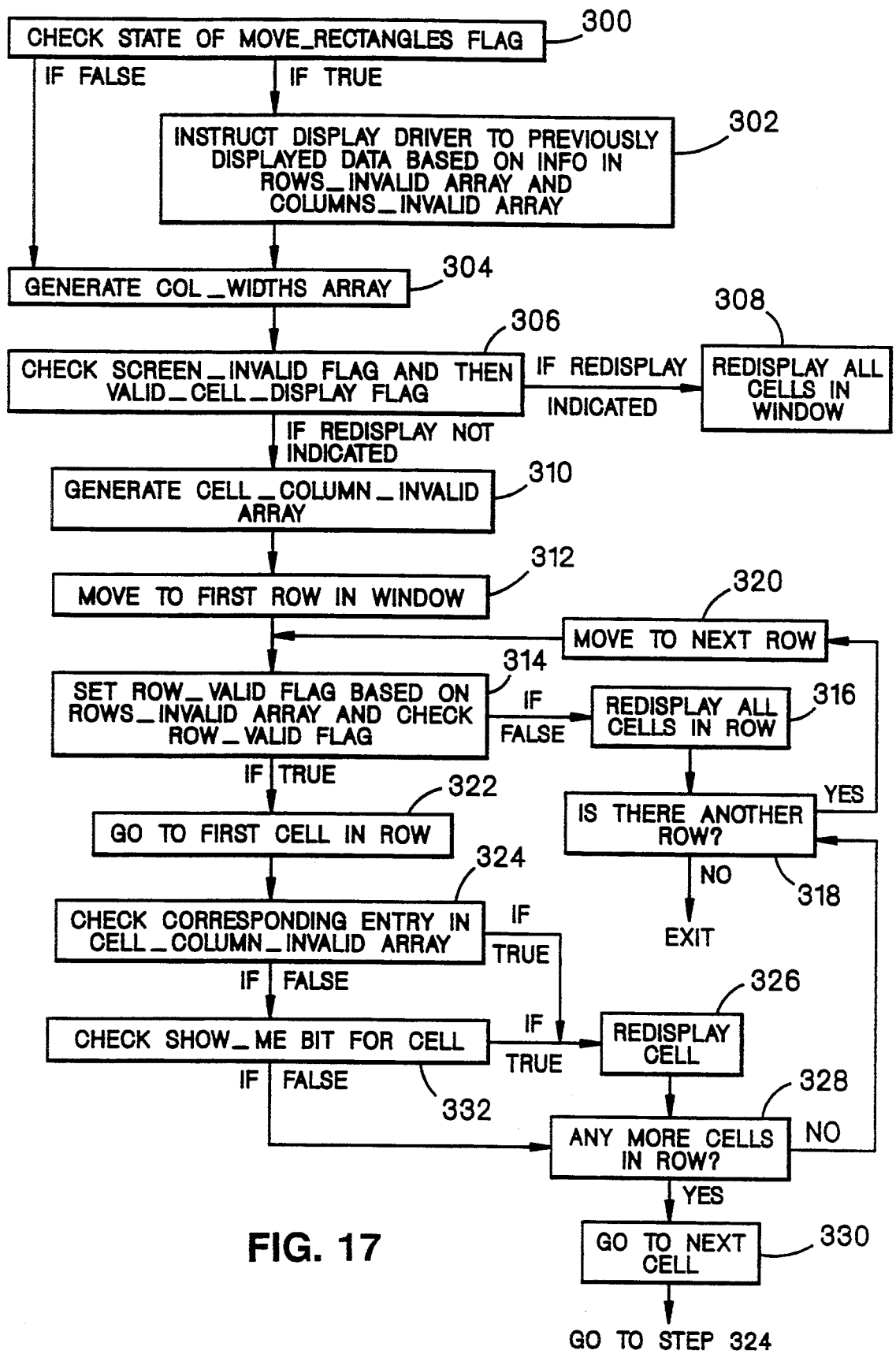
FIG. 17 is a flow chart of the cell data display subroutine.

After the frames redisplay subroutine has completed, display manager 32 calls the cell data display subroutine illustrated in FIG. 17 to carry out a similar process for the scrollable region of the window. The following description, which assumes that a single window is being displayed and that no title rows or columns have been defined, provides a functional overview of this process.

Display manager 32 first examines the move_rectangles flag (see the invalidations flags in window record 88, FIG. 8) to determine whether either rows invalid array 110 or columns_invalid array 114 have been changed since the last redisplay cycle (step 300). If they have changed, display manager 32 examines both of these arrays to identify the portions of the previously displayed cell area that still remain in the visible region of the screen and the portions which must be redisplayed. For those entries in the arrays that do not contain FF's (i.e, they contain valid numbers), display manager 32 directs display driver 33 to continue displaying the corresponding portions of the previously displayed worksheet, translated to the new locations on the screen, if appropriate (step 302).

To assist the rest of the redisplay process, display manager 32 converts the information stored in the c_widths array found in storage location 108(1) of the display_info record 106 into screen locations for the displayed columns and stores this information in a col. widths array (step 304). This information is used throughout this phase of the redisplay cycle instead of repeatedly translating the column width information into screen locations for display driver 33 each time such information is needed.

Next, display manager 32 checks screen_invalid flag 122 and then the valid_cell_display flag in window record 88 to determine whether a complete redisplay of the cell area is required (step 306). If either screen_invalid flag 122 is TRUE or the valid_cell_display flag is FALSE, display manager 32 proceeds directly to redisplaying all of the cells in the displayed region of the window (step 308). On the other hand, if neither of these flags indicate a need for a complete redisplay, display manager 32 prepares to scan the visible region of the worksheet cell-by-cell, row-by-row to identify on a cell-by-cell basis which areas must be redisplayed and which areas contain information that was unchanged since the last redisplay cycle.

Before starting to scan the rows, display manager 32 again converts the information stored in columns_invalid array 114 for the window into a form more useful to the rest of the redisplay operation and stores the results in cell_column_invalid array 118 (step 310).

The scan begins at the screen origin which is identified by the ORIGY and ORIGX values are stored in the layout record 100 for the worksheet being displayed (step 312). At the start of the scan of the first row, display manager 32 checks rows_invalid array 110 and sets a row_valid flag to indicate the state of the corresponding storage location in rows_invalid array (step 314). In the case of the first row, for example, display manager 32 sets the row_valid flag to FALSE if the first location of rows_invalid array 110 contains an FF and it sets the row_valid flag to TRUE if the first storage location contains a valid index number.

After having conditioned the row_valid flag, display manager 32 checks its state (step 314). If the row_valid flag is FALSE, indicating that the entire displayed row must be redisplayed, then display manager 32 proceeds with redisplaying all of the cells in the visible region of that row (step 316). That is, for each cell, display manager 32 calls on cell manager 26 and format manager 28 to return a data string describing the formatted contents of the cell, which it then sends to display driver 33. At the completion of the row, display manager checks whether there is another row in the visible region of the window that needs to be scanned (step 318). If there is another row, display manager 32 moves to the next row (step 320) and then branches back to step 314 to repeat the above described steps for the next row. If there are no other rows to be scanned, this portion of the redisplay routine terminates.

In step 314, if the row_valid flag is TRUE, display manager 32 begins on a cell-by-cell basis to determine whether the corresponding cell must be redisplayed. Starting with the first cell location (step 322), display manager 32 checks the corresponding entry in cell_column_invalid array 118 (step 324). If the entry is 1, indicating that the entire column must be redisplayed, display manager 32 redisplays the contents of the cell (step 326). Then, a check is made as to whether there are more cells in the visible region of the row (step 328). If there are, display manager 32 moves to the next cell (step 330) and then branches back to step 324 to repeat the process for the next cell. If, on the other hand, there are no more cells in the row, display manager 32 branches back to step 318 where it checks whether there are more rows in the visible region of the worksheet.

In step 324 if the entry in the cell_column_invalid array is zero, display manager 32 then checks the corresponding show_me bit in the show_me_bits data structure 86 (step 332). The show_me bit indicates whether cell manager 26 has changed the cell's contents since the last redisplay cycle. If the show_me bit is TRUE, display manager 32 branches to step 326 where it redisplays the cell. Otherwise, display manager 32 branches to step 328 where it determines whether there are more cells in the visible region of the row and proceeds as described earlier.

Upon completing the above-described sequence of operations for all of the cells within the window, the cell display subroutine eliminates the temporary data structures used during this phase, including the cell_column_valid array and the col_widths array and then terminates. Display manager 32 then calls the cell pointer display routine to redisplay the cellpointer if it has been moved since the last redisplay cycle. The cell pointer display routine checks cellpointer_valid flag 132 to determine whether the cellpointer must be redisplayed. Once the cell pointer has been properly updated, window_show 164 terminates and display manager 32 calls indicator_show 168.

Indicator_show 168 compares indicator_old array 141 to the indicator_new array 143 to identify the portions of the indicator area which must be updated.

After the display screen has been redisplayed, the display manager initializes all data structures and all flags that are used to record changes to the display between redisplay cycles. This includes rows_invalid array 110 and columns_invalid array 114, the invalidation bits in each window record, the global flags shown in FIG. 13, menu_old array 136 and indicator_old array 141.

Other embodiments are within the following claims.

What is claimed is:

1. A display management system for use with a computer that includes a display system, the display management system comprising:
   means for representing an image that is to be displayed on said display system;
   means for periodically updating the display system to display a screen image that corresponds to the state of said image representing means existing at the time of said update; and
   means for changing the state of said image representing means in response to the computer's execution of a sequence of command routines after a last update of said display system and prior to the next update of said display system, wherein the computer's execution of each of the command routines of said sequence of command routines modifies information that was displayed on the last update of said display system and said changing means changes the state of said image representing means so as to record a cumulative effect of the execution of said sequence of command routines on the image that was displayed on said display system during the last update, and wherein said updating means performs the update of the display system asynchronously with respect to when said changing means changes the state of said image representing means.

2. The display management system of claim 1 wherein said updating means updates said display system only if said image representing means indicates that a change in the state of said image representing means has occurred since the last update of said display system.

3. The display management system of claim 2 wherein the computer is programmed to provide data storage and management services and the screen image that is to be displayed on said display system is a visual presentation of a selected region of stored data.

4. The display management system of claim 3 wherein the computer is programmed to provide spreadsheet services which organize user supplied information into one or more worksheets each of which includes an array of cells and wherein said selected region of stored data comprises a corresponding selected region of one of said one or more worksheets.

5. The display management system of claim 4 further comprising means for generating a map of the cells within the selected region of said worksheet and for using said map to identify those cells within said region whose contents have changed since the last update of the display system.

6. The display management system of claim 5 wherein said updating means updates the display system also based upon the information stored in said map.

7. The display management system of claim 2 wherein said image representing means comprises a first data structure that represents at least part of the image displayed during the last update of the display system and a second data structure that represents at least part of the image that is to be displayed on said display system during the next update of the display system, wherein said second data structure records modifications to information displayed during the last update of said display system by the execution of said sequence of command routines.

8. The display management system of claim 7 wherein said updating means compares the first data structure to the second data structure to determine whether the image that is to be displayed on said display system during said next update of the display system has changed since the last update of the display system and updates the display system based upon that comparison.

9. The display management system of claim 4 wherein the selected region of the worksheet comprises a plurality of rows and wherein said image representing means comprises a row array having a plurality of entries each of which corresponds to a different one of said rows of the selected region of the worksheet.

10. The display management system of claim 9 wherein said changing means uses said row array to keep track of the location of said rows when the image that is to be displayed on said display system is scrolled in a vertical direction.

11. The display management system of claim 9 wherein said updating means uses said row array to identify which of said rows of the image that is to be displayed on said display system were displayed during the last display cycle, to identify which of said rows of the image that is to be displayed on said display system were not present during the last display cycle and to determine the screen locations of said identified rows.

12. The display management system of claim 11 wherein said updating means redisplays the identified new rows during the next redisplay cycle and instructs the display system to continue displaying the identified previously displayed rows at the corresponding screen locations indicated by said row array.

13. The display management system of claim 4 wherein the selected region of the worksheet comprises a plurality of columns and wherein said image representing means comprises a column array having a plurality of entries each of which corresponds to a different one of said columns of the selected region of the worksheet.

14. The display management system of claim 13 wherein said changing means uses said column array to keep track of the location of said columns when the image that is to be displayed on said display system is scrolled in a horizontal direction.

15. The display management system of claim 13 wherein said updating means uses said column array to identify which of said columns of the image that is to be displayed on said display system were displayed during the last display cycle, to identify which of said columns of the image that is to be displayed on said display system were not present during the last display cycle and to determine the screen locations of said identified columns.

16. The display management system of claim 15 wherein said updating means redisplays the identified new columns during the next redisplay cycle and instructs the display system to continue displaying the identified previously displayed columns at the corresponding screen locations indicated by said column array.

17. The display management system of claim 3 further comprising means for indicating whether the plurality of successive changes that are made to the image that is to be displayed on said display system since the last update of the display system have resulted in a complete change of the cell region of the worksheet present in the image that is to be displayed on said display system.

18. A method for managing a display system on a computer, the method comprising:
representing an image that is to be displayed on said display system by an image representation;
periodically updating the display system to display a screen image that corresponds to the state of said image representation existing at the time of said update; and
changing the state of said image representation in response to the computer's execution of a sequence of command routines after a last update of said display system and prior to the next update of said display system, wherein the computer's execution of each of the command routines of said sequence of command routines modifies information that was displayed on the last update of said display system and wherein said changing step changes the state of said image representation so as to record a cumulative effect of the execution of said sequence of command routines on the image that was displayed on said display system during the last update, and wherein said updating step updates the display system asynchronously with respect to when said state changing step changes the state of said image representation.

19. The method of claim 18 wherein the computer is programmed to provide data storage and management services and the screen image that is to be displayed on said display system is a visual presentation of a selected region of stored data.

20. The method of claim 19 wherein the computer is programmed to provide spreadsheet services which organize user supplied information into one or more worksheets each of which includes an array of cells and wherein said selected region of stored data comprises a corresponding selected region of one of said one or more worksheets.

21. The method of claim 20 further comprising the steps of generating a map of the cells within the selected region of said worksheet and using said map to identify those cells within said region whose contents have changed since the last update of the display screen.

22. The method of claim 21 wherein said updating step updates the display system also based upon the information stored in said map.

23. The display management system of claim 20 wherein said image representation comprises a first data structure that represents the image displayed during the last update of the display screen and a second data structure that represents the image that is to be displayed on said display system.

24. The method of claim 23 wherein said updating step comprises comparing the first data structure to the second data structure to determine whether the image that is to be displayed on said display system has changed since the last update of the display screen and said updating step updates the display screen based upon that comparison.

25. The method of claim 20 wherein the selected region of the worksheet comprises a plurality of rows and wherein said image representation comprises a row array having a plurality of entries each of which corresponds to a different one of said rows of the selected region of the worksheet.

26. The method of claim 25 wherein said changing step uses said row array to keep track of the location of said rows when the image that is to be displayed on said display system is scrolled in a vertical direction.

27. The method of claim 25 wherein said updating step uses said row array to identify which of said rows of the image that is to be displayed on said display system were displayed during the last display cycle, to identify which of said rows of the image that is to be displayed on said display system were not present during the last display cycle and to determine the screen locations of said identified rows.

28. The method of claim 27 wherein said updating step comprises redisplaying the identified new rows during the next redisplay cycle and instructing the display system to continue displaying the identified previously displayed rows at the corresponding screen locations indicated by said row array.

29. The method of claim 20 wherein the selected region of the worksheet comprises a plurality of columns and wherein said image representation comprises a column array having a plurality of entries each of which corresponds to a different one of said columns of the selected region of the worksheet.

30. The method of claim 29 wherein said changing step uses said column array to keep track of the location of said columns when the image that is to be displayed on said display system is scrolled in a horizontal direction.

31. The method of claim 29 wherein said updating step uses said column array to identify which of said columns of the image that is to be displayed on said display system were displayed during the last display cycle, to identify which of said columns of the image that is to be displayed on said display system were not present during the last display cycle and to determine the screen locations of said identified columns.

32. The method of claim 31 wherein said updating step comprises redisplaying the identified new columns during the next redisplay cycle and instructing the display system to continue displaying the identified previously displayed columns at the corresponding screen locations indicated by said column array.

33. The method of claim 19 further comprising the step of indicating whether the plurality of successive changes that are made to the image that is to be displayed on said display system since the last update of the display system have resulted in a complete change of the cell region of the worksheet present in the image that is to be displayed on said display system.

* * * * *